US010861069B2

(12) United States Patent
Hutchinson et al.

(10) Patent No.: US 10,861,069 B2
(45) Date of Patent: *Dec. 8, 2020

(54) METHODS AND SYSTEMS TO MAINTAIN, CHECK, REPORT, AND AUDIT CONTRACT AND HISTORICAL PRICING IN ELECTRONIC PROCUREMENT

(71) Applicant: Coupa Software Incorporated, San Mateo, CA (US)

(72) Inventors: John Hutchinson, Cincinnati, OH (US); Venkateswaran Krishnan, Bangalore (IN); Senthilkumar Vadivel, Mason, OH (US)

(73) Assignee: Coupa Software Incorporated, San Mateo, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 16/053,157

(22) Filed: Aug. 2, 2018

(65) Prior Publication Data

US 2019/0102814 A1 Apr. 4, 2019

Related U.S. Application Data

(63) Continuation of application No. 13/309,109, filed on Dec. 1, 2011, now Pat. No. 10,068,266.
(Continued)

(51) Int. Cl.
*G06Q 30/00* (2012.01)
*G06Q 30/06* (2012.01)

(52) U.S. Cl.
CPC ......... *G06Q 30/06* (2013.01); *G06Q 30/0609* (2013.01)

(58) Field of Classification Search
CPC .................................................. G06Q 30/06–08
(Continued)

(56) References Cited

U.S. PATENT DOCUMENTS 5,317,737 A 5/1994 Barton
5,628,011 A 5/1997 Ahamed et al.
(Continued)

OTHER PUBLICATIONS

Version 4.0 of ViniSyndicate Catalog Integration System(TM) for E-Procurement. Dec. 6, 2010, 2 pages, downloaded from ProQuest Direct on the Internet on Oct. 17, 2014 (Year: 2010).*
(Continued)

*Primary Examiner* — Ethan D Civan
(74) *Attorney, Agent, or Firm* — Baker Botts L.L.P.

(57) ABSTRACT

Disclosed embodiments provide an electronic procurement system and process that enables a buyer or purchasing organization to maintain explicitly or implicitly, a contract price between the buyer/purchasing organization and the supplier whose catalog is integrated with an electronic marketplace. In one embodiment, a process is executed to compare the listed/purchase price of catalog items against the contract price or against a 'normal' purchase price. A user (e.g. the buyer) may also be able to configure and receive specific alerts regarding items that are purchased in deviation of the contracted price and items that have been added to the catalog since the last contract. Disclosed embodiments may also maintain, automatically, the historical price and purchase information of supplier catalog items that are enabled through the electronic marketplace. The user may be able to view a history of prices at which the supplier catalog item was listed in the catalogs as well as purchased by users in the same organization.

18 Claims, 26 Drawing Sheets

Related U.S. Application Data

(60) Provisional application No. 61/418,947, filed on Dec. 2, 2010.

(58) Field of Classification Search
USPC .................................................. 705/26.1–27.2
See application file for complete search history.

(56) References Cited

U.S. PATENT DOCUMENTS

| | | | |
|---|---|---|---|
| 5,712,989 A | 1/1998 | Johnson et al. |
| 5,768,580 A | 6/1998 | Wical |
| 5,859,972 A | 1/1999 | Subramaniam et al. |
| 5,940,821 A | 8/1999 | Wical |
| 6,028,605 A | 2/2000 | Conrad et al. |
| 6,038,560 A | 3/2000 | Wical |
| 6,119,101 A | 9/2000 | Peckover |
| 6,175,830 B1 | 1/2001 | Maynard |
| 6,233,586 B1 | 5/2001 | Chang et al. |
| 6,263,342 B1 | 7/2001 | Chang et al. |
| 6,272,488 B1 | 8/2001 | Chang et al. |
| 6,330,714 B1 | 12/2001 | Hicks et al. |
| 6,370,541 B1 | 4/2002 | Chou et al. |
| 6,446,083 B1 | 9/2002 | Leight et al. |
| 6,463,430 B1 | 10/2002 | Brady et al. |
| 6,466,933 B1 | 10/2002 | Huang et al. |
| 6,484,166 B1 | 11/2002 | Maynard |
| 6,513,027 B1 | 1/2003 | Powers et al. |
| 6,556,976 B1 | 4/2003 | Callen |
| 6,578,046 B2 | 6/2003 | Chang et al. |
| 6,647,383 B1 | 11/2003 | August et al. |
| 6,650,998 B1 | 11/2003 | Rutledge et al. |
| 6,654,813 B1 | 11/2003 | Black et al. |
| 6,665,681 B1 | 12/2003 | Vogel |
| 6,728,704 B2 | 4/2004 | Mao et al. |
| 6,732,160 B2 | 5/2004 | Ambrosini et al. |
| 6,735,760 B1 | 5/2004 | Dice |
| 6,768,999 B2 | 7/2004 | Prager et al. |
| 6,772,153 B1 | 8/2004 | Bacon et al. |
| 6,778,975 B1 | 8/2004 | Anick et al. |
| 6,792,416 B2 | 9/2004 | Soetarman et al. |
| 6,792,601 B1 | 9/2004 | Dimpsey et al. |
| 6,859,937 B1 | 2/2005 | Narayan et al. |
| 6,868,525 B1 | 3/2005 | Szabo |
| 6,895,407 B2 | 5/2005 | Romer et al. |
| 6,920,448 B2 | 7/2005 | Kincaid et al. |
| 6,922,691 B2 | 7/2005 | Flank |
| 6,941,294 B2 | 9/2005 | Flank |
| 6,944,611 B2 | 9/2005 | Flank et al. |
| 6,988,099 B2 | 1/2006 | Wiser et al. |
| 6,994,612 B2 | 2/2006 | Cron |
| 7,031,961 B2 | 4/2006 | Pitkow et al. |
| 7,035,870 B2 | 4/2006 | McGuire et al. |
| 7,069,308 B2 | 6/2006 | Abrams |
| 7,073,133 B2 | 7/2006 | Hughes et al. |
| 7,085,771 B2 | 8/2006 | Chung et al. |
| 7,113,939 B2 | 9/2006 | Chou et al. |
| 7,117,214 B2 | 10/2006 | Wiser et al. |
| 7,177,818 B2 | 2/2007 | Nair |
| 7,177,879 B2 | 2/2007 | Flank et al. |
| 7,181,438 B1 | 2/2007 | Szabo |
| 7,188,153 B2 | 3/2007 | Lunt et al. |
| 7,222,090 B2 | 5/2007 | Oddo |
| 7,272,833 B2 | 9/2007 | Yaung |
| 7,330,846 B1 | 2/2008 | Dirisala et al. |
| 7,343,371 B2 | 3/2008 | Ibuki et al. |
| 7,418,444 B2 | 8/2008 | Flank et al. |
| 7,451,161 B2 | 11/2008 | Zhu et al. |
| 7,461,024 B2 | 12/2008 | Montgomery |
| 7,519,605 B2 | 4/2009 | Vailaya et al. |
| 7,536,386 B2 | 5/2009 | Samji et al. |
| 7,555,448 B2 | 6/2009 | Hsieh |
| 7,565,425 B2 | 7/2009 | Vleet et al. |
| 7,567,953 B2 | 7/2009 | Kadayam et al. |
| 7,567,963 B2 | 7/2009 | Shpeisman et al. |
| 7,610,585 B2 | 10/2009 | Shpeisman et al. |
| 7,620,572 B2 | 11/2009 | Bowman et al. |
| 7,660,783 B2 | 2/2010 | Reed |
| 7,703,030 B2 | 4/2010 | Smirin et al. |
| 7,707,167 B2 | 4/2010 | Kishore et al. |
| 7,721,192 B2 | 5/2010 | Milic-Frayling et al. |
| 7,739,218 B2 | 6/2010 | Arguello et al. |
| 7,756,750 B2 | 7/2010 | Venkiteswaran |
| 7,761,385 B2 | 7/2010 | Hutchison et al. |
| 7,801,879 B2 | 9/2010 | Jones |
| 7,860,852 B2 | 12/2010 | Brunner et al. |
| 7,865,358 B2 | 1/2011 | Green et al. |
| 7,957,985 B2 | 6/2011 | Kashani et al. |
| 7,996,282 B1 | 8/2011 | Scott et al. |
| 8,036,957 B2 | 10/2011 | Ettl et al. |
| 8,046,273 B2 * | 10/2011 | Welter ................ G06Q 10/087 |
| | | 705/26.8 |
| 8,051,450 B2 | 11/2011 | Robarts et al. |
| 8,055,673 B2 | 11/2011 | Churchill et al. |
| 8,060,513 B2 | 11/2011 | Basco et al. |
| 8,126,882 B2 | 2/2012 | Lawyer |
| 8,166,016 B2 | 4/2012 | Higgins et al. |
| 8,204,797 B2 | 6/2012 | Wanker |
| 8,249,885 B2 | 8/2012 | Berkowitz et al. |
| 8,266,130 B2 | 9/2012 | Jones et al. |
| 8,396,859 B2 | 3/2013 | Green et al. |
| 8,554,755 B2 | 10/2013 | Richardson et al. |
| 9,070,164 B2 | 6/2015 | Venkiteswaran |
| 9,607,324 B1 | 3/2017 | Reed et al. |
| 9,996,863 B2 | 6/2018 | Venkiteswaran |
| 10,007,729 B1 | 6/2018 | Reed et al. |
| 10,068,266 B2 * | 9/2018 | Hutchinson ........ G06Q 30/0609 |
| 2001/0014905 A1 | 8/2001 | Onodera |
| 2001/0034659 A1 | 10/2001 | Kobayashi |
| 2001/0037332 A1 | 11/2001 | Miller et al. |
| 2001/0039592 A1 | 11/2001 | Carden |
| 2002/0065744 A1 | 5/2002 | Collins |
| 2002/0077929 A1 | 6/2002 | Knorr et al. |
| 2002/0082952 A1 | 6/2002 | Johnston |
| 2002/0120685 A1 | 8/2002 | Srivastava et al. |
| 2002/0147656 A1 | 10/2002 | Tam et al. |
| 2002/0165856 A1 | 11/2002 | Gilfillan et al. |
| 2002/0194208 A1 | 12/2002 | Knoll et al. |
| 2003/0084010 A1 | 5/2003 | Bigus et al. |
| 2003/0120653 A1 | 6/2003 | Brady et al. |
| 2004/0167827 A1 | 8/2004 | Vincent et al. |
| 2005/0010561 A1 | 1/2005 | de Bois et al. |
| 2005/0027611 A1 | 2/2005 | Wharton |
| 2005/0149538 A1 | 7/2005 | Singh |
| 2005/0160107 A1 | 7/2005 | Liang |
| 2007/0027811 A1 | 2/2007 | Jackson et al. |
| 2008/0040332 A1 | 2/2008 | Lee et al. |
| 2008/0275719 A1 | 11/2008 | Davis et al. |
| 2008/0281793 A1 | 11/2008 | Mathur |
| 2008/0306924 A1 | 12/2008 | Paolini |
| 2009/0271212 A1 | 10/2009 | Savjani et al. |
| 2009/0327006 A1 | 12/2009 | Hansan et al. |
| 2010/0169228 A1 | 7/2010 | Rothley et al. |
| 2012/0143721 A1 | 6/2012 | Hutchinson et al. |
| 2012/0143725 A1 | 6/2012 | Hutchinson et al. |
| 2017/0161283 A1 | 6/2017 | Reed et al. |

OTHER PUBLICATIONS

Basware, Realize Tomorrow's Financial Goals Today, downloaded Jul. 19, 2018 from https://www.basware.com/en-us/about-basware, 2018, 20 pgs.

BirchStreet Systems, Procure-to-Pay on Demand, downloaded Jul. 19, 2018 from https://www.birchstreetsystems.com/about-us/, 2017, 6 pgs.

CapGemini, Annual Report, 2017, downloaded Jul. 19, 2018 from https://reports.capgemini.com/2017/wp-content/uploads/2018/03/CapG_RA17_UK-2.pdf, 41 pgs.

Cheeriojs/cheerio, GitHub, Inc., 2018, downloaded from https://github.com/cheeriojs/cheerio.

Coupa Software, Inc., Why Coupa, downloaded Jul. 19, 2018 from https://www.coupa.com/why-coupa/, 2018, 25 pgs.

Determine, Inc., About us, downloaded Jul. 19, 2018 from https://www.determine.com/about-us, 2018, 12 pgs.

(56) References Cited

OTHER PUBLICATIONS

GEP, Who we are: About GEP, downloaded Jul. 19, 2018 from https://www.gep.com/company, 2018, 28 pgs.
"Glovia Rolls Out a Powerful, Web-Enabled Configuration Solution." Business Editors and High-tech Writers. Business Wire. New York: May 16, 2001, p. 1, Retrevied via ProQuest on Feb. 27, 2010.
Holst, C., "Infinite Scrolling, Pagination Or "Load More" Buttons? Usability Findings In eCommerce," Smashing Magazine, Mar. 1, 2016, downloaded from https://www.smashingmagazine.com/2016/03/pagination-infinite-scrolling-load-more-buttons/, 23 pgs.
http://findarticles.com/p/articles/mi_hb3381/is_200011/aLn8119940/,Vinimaya Inc. (business to business online shopping services), Purchasing, Nov. 16, 2000, (p. 1).
http://findarticles.com/p/articles/mi_hb5932/is_20011 0/ai_n23885081/, Vinimaya Upgrades ViniSyndicate. (Brief Article) (Product Announcement), The online Reporter, Oct. 15, 2001, (p. 1).
http://findarticles.com/p/articles/mi_mOEIN/is_2000_Nov_6/ai_66626613/, "Vinimaya Expands B2B e-Procurement Platform to 20 Verticals; B2B Marketplaces and Suppliers Can Join the Network to Instantly Reasch Fortune 2000 Purchasing Managers," Business Wire, Nov. 6, 2000 (pp. 1-3).
http://findarticles.com/p/articles/mLmOEIN/is_2000_Oct_11/aL65946458/, "Vinimaya Partners with AnswerPal to Establish B2B Content Development Arm," Business Wire, Oct. 11, 2000, (pp. 1-2).
http://kapowtech.com/index.php/about-us, "About Kapow Technologies," Kapow Technologies website, 2009.
http://www.inc.com/inc5000/2008/company-profile.html?id-200836760, "Company Profile," Inc. 5000, 2009.
Ivalua, Inc., About Ivalua: The Procurement Empowerment Platform, downloaded Jul. 19, 2018 from https://www.ivalna.com/company/about-us/, 2008, 10 pgs.
Letter from PurchasingNet, Inc., May 24, 2006 (4 pages).
Perfect Commerce, About Us, downloaded Jul. 19, 2018 from https://www.linkedin.com/company/perfect-commerce, 2017, 4 pgs.
PhantonJS—Scriptable Headless Browser, Mar. 2018, downloaded from http://phantomjs.org/, 1 pg.
Proactis, ReThink Commerce, downloaded Jul. 19, 2018 from https://www.proactis.com/us/company/about/, 2018, 24 pgs.
Real-Time Computing, description, May 24, 2018, downloaded from https://en.wikipedia.org/wiki/Real-time_computing, citing Martin, J., *Programming Real-time Computer Systems*, Prentice-Hall, Inc., Englewood Cliffs, NJ, 1965, p. 4, https://en.wikipedia.org/wiki/Real-time_computing#cite_note-3, 3 pgs.
SAP SE, Procurement and Networks, downloaded Jul. 19, 2018 from https://www.sap.com/products/e-procurement.html, 2018, 12 pgs.
SeleniumHQ—Browser Automation, Apr. 4, 2018, downloaded from https://www.seleniumhq.org/, 3 pgs.
Version 4.0 of ViniSyndicate Catalog Integration System™ for E-Procurement. Dec. 6, 2010, 2 pgs. Downloaded from ProQuest Direct on the Internet on Oct. 17, 2014.
Vinimaya website screenshots, Vinimaya website, purported 2000, pp. 1-3.
Wax Digital Limited, A Little Bit About Wax Digital, downloaded Jul. 19, 2018 from https://www.waxdigital.com/who-we-are/, 2018, 21 pgs.
www.ask.com—Website of fetching answer to any question asked owned by InterActiveCorp. Viewed Apr. 8, 2010.
www.clusty.com—Website of combining several top search engines owned by Vivisimo, Viewed Apr. 8, 2010.
www.facebook.com—Website of social networking owned by Facebook, Inc. Viewed on Apr. 8, 2010.
www.google.com—Website of hunting for text in webpages owned by Google Inc. Viewed Apr. 8, 2010.
www.linkedin.com—Website of business-oriented social networking. Viewed on Apr. 8, 2010.
www.myspace.com—Website of social networking owned by News Corporation. Viewed Apr. 8, 2010.
www.yahoo.com—Website of knowledge-sharing for the community. Viewed Apr. 8, 2010.
U.S. Appl. No. 12/692,117, filed Jan. 22, 2010, by Reed et al.
U.S. Appl. No. 15/889,815, filed Feb. 6, 2018, by Venkiteswaran.
U.S. Appl. No. 16/007,373, filed Jun. 13, 2018, by Kitson et al.
U.S. Appl. No. 16/016,931, filed Jun. 25, 2018, by Reed et al.
U.S. Appl. No. 60/336,057, filed Nov. 30, 2001.
U.S. Appl. No. 61/146,967, filed Jan. 23, 2009, by Reed et al.
U.S. Appl. No. 61/146,999, filed Jan. 23, 2009, by Reed et al.
U.S. Appl. No. 61/372,688, filed Aug. 11, 2010, by Reed et al.
U.S. Appl. No. 61/418,936, filed Dec. 2, 2010, by Hutchinson et al.
U.S. Appl. No. 61/418,947, filed Dec. 2, 2010, by Hutchinson et al.
U.S. Appl. No. 62/520,756, filed Jun. 16, 2017, by Reed et al.

\* cited by examiner

FIG. 7

| | Customer (User) | Customer (Administrator) | Client Browser | VSMT System (Application Server) | VSMT System (Database Server) |
|---|---|---|---|---|---|
| Prepare and Upload Contract Data File (Excel) | | A | P | | |
| Extract Contract Data from Excel File | | | | A | |
| Specify Contract Data Fields Mapping Information | | A | P | | |
| Save Contract Data Fields Mapping Information | | | | A | P |
| Track Price History of Search Results | | | | A | P |
| Track Purchase History | | | | A | P |
| Request Price & Purchase History (Price Check) | A | | | | |
| Compute Price Statistics and Send Information to Client | | | | A | P |
| Display Price Graph and Statistics | | | A | P | |
| Setup Audit Baseline | | A | | | |
| Setup Audit Schedule | | A | | | |
| Run Scheduled Audits and send report to client | | | | A | P |
| View Audit Report | | | A | P | |
| Select items for Price Comparison | A | | | | |
| Display Multi-item Price Comparison Graph | | | A | P | |
| Setup Shopping Restriction Information | | A | | | P |
| Checkout Items from Cart | A | | | | |
| Calculate Price differences between cart and acceptable price | | | | A | P |
| Display shopping restriction information | | | A | P | |
| Prevent checkout | | | | A | P |

Legend
Participant P
Actor A

Create New Audit for supplier : Supplier1

Fields marked with " are mandatory

Enter Audit Name "    [Supplier1]

Enter the Email Id(s) to send a Audit Report "    [                ] [Add]

-- List of Email Id(s) --
tech-support@vinimaya.com                                [Remove]

Enter Audit Additional Notes    [Audit the MRO items]

Select the Audit Run Schedule "    [Daily ▾]

Select Time [Hour : Minute : Second] "    [16 ▾] : [00 ▾] : [00 ▾]

Enable "    [True ▾]

[Cancel] [Save & Exit] [Save and Create Baseline]

Price Auditing - Baseline Configuration for XXXXXXXXXX    [« Back] [Update & Exit] [Update & Add New Baseline]

Total results for paper 150    [Enter Refine Term] [Refine]

Tolerance (in %) [        ] [Apply To All]

Select All Clear All [Remove]

FIG. 8

| Select | Description | Unit | Supplier Part # | Mfg Part # | Mfg Name | Price △ | Tolerance (in %) | Remove |
|---|---|---|---|---|---|---|---|---|
| | 9 x 13 ¾ in. Emery Polishing Paper Width: 9 Length: 13-3/4 Grit: 1 Material: Emery | 1 EA | 00378349 | 66261101300 | Norton | 0.0 | 0.0 | Remove |
| ☐ | Paper - Abrasive Sheets Width: 4-1/2 Length: 5 ½ Grit: 220 Material: Silicon Carbide | 1 EA | 86817350 | 00051144103317 | 3M | 0.1881 | 2.0 | Remove |
| ☐ | Paper - Abrasive Sheets Width: 3 ⅔ Length: 9 Grit: 240 Material: Silicon Carbide | 1 EA | 06929843 | 00051144102747 | 3M | 0.2556 | 1.0 | Remove |
| ☐ | Paper - Abrasive Sheets Width: 9 Length: 11 Grit: 280 Material: Silicon Carbide | 1 EA | 05892807 | | Value | 0.434 | 2.0 | Remove |

Price Audit Summary Report (Supplier-wise)

« Back | Export to Excel

Supplier Name: XXXXXXXXXXX

Audit(s):
admin ~ XXXXXXXXX

Price Change Items: 29
Total Increase: 29
Total Decrease: 0

Newly Added Items: 1

Removed Items: 121

FIG. 11

Price Audit Report

| Report Header | | Price Audit Configuration | |
|---|---|---|---|
| Generated On | Thursday, October 21, 2010 12:00 AM | Supplier | XXXX |
| ☐ Price Mismatch | 1 | Audit Name | cable |
| ☐ Newly Added Items | 152 | Audit Owner | XXXXX |
| ☐ Removed Items | 14 | Comments | |

*Price Change Item(s)*

| Search Term | Search Type | S. No. | Description | UOH | Supplier Part # | Mfg Part # | Mfg Name | Real-Time Price | Base-Line Price | Tolerance (in %) |
|---|---|---|---|---|---|---|---|---|---|---|
| cable | Keyword | 1 | XXX7 CAT5e or CAT5 PJ45 Patch Cable Black | EA | 1326057 | A3L781-07-BLK | | 1.33 | 1.19 | 10.0 |
| | | | | | | | Total | 1.33 | 1.19 | |

*New Item(s)*

| Search Term | Search Type | S. No. | Description | UOH | Supplier Part # | Mfg Part # | Mfg Name | Contract Price |
|---|---|---|---|---|---|---|---|---|
| cable | Keyword | 1 | Cables to Go patch cable - 10 ft | EA | 533498 | 27143 | | 4.51 |
| cable | Keyword | 2 | Belkin crossover cable - 7 ft | EA | 160854 | A3X126-07-YLW-M | | 2.21 |
| cable | Keyword | 3 | Tripp Lite 10' Yellow Cat6 Gigabit Snagless Patch Cable | EA | 559150 | N201-010-YW | | 4.34 |
| cable | Keyword | 4 | Cables to Go patch cable - 10 ft | EA | 1124057 | 27193 | | 4.54 |
| cable | Keyword | 5 | Cables to Go patch cable - 5 ft | EA | 1245863 | 15185 | | 1.88 |
| cable | Keyword | 6 | Cables to Go 7ft Cat 6 550Mhz Snagless Patch Cable White | EA | 533496 | 27162 | | 2.55 |

FIG. 12

Contract Catalog Management

| S. No. | Supplier Name | Items in Contract | Action | |
|---|---|---|---|---|
| 1 | 1. Supplier 1 [Demo] [Supplier Direct] | 0 | Upload Catalog | |
| 2 | 2. Supplier 2 [Supplier Direct] | 0 | Upload Catalog | |
| 3 | 3. Supplier 3 [Demo] [iWeb Catalog] | 20 | Add more Items | Delete |
| 4 | 4. Supplier 4 [Demo] [Web Catalog] | 0 | Upload Catalog | Export |

BACK

FIG. 13

Catalog Field Mapping

Supplier Name: 2. Supplier 2

| S. No. | Destination table fields | Excel catalog fields | |
|---|---|---|---|
| 1 | SUPPLIER_PART_NO | Supplier Part # | ∨ |
| 2 | UOM | Select a field | ∨ |
| 3 | CONTRACT_PRICE | Select a field | |
| 4 | TOLERANCE | Effective Date | |
| 5 | EFFECTIVE_DATE | Expiry Date | |
| 6 | EXPIRY_DATE | Price | |
| | | Supplier Part # | |
| | | Tolerance | |
| | | UOM | |

[ Map Fields ]  [ Exit ]

FIG. 14

Confirm Import

Supplier Name: 2. Supplier 2
No of valid records found: 24
No of records with error: 2     Click for details
All the item(s) are having error. Click on the link above to see the error details.

( BACK )

Price Change Report for XXXXXXXX

| No | Supplier Part # | Mfg Part # | Unit | Description | Price History Low | Price History Medium | Price History High | Most Recent Price | Contract Baseline Price | Contract Baseline Tolerance | Price Difference |
|---|---|---|---|---|---|---|---|---|---|---|---|
| 1 | 043322472 | | EA | Hex - Fastening Nuts Type: Handy Hex Nut Height Weight Thread Size 4-20 Hex Height 1584 Material: Stainless Steel Fresh Coating Plain | $0.22 | $0.25 | $0.28 View History | $0.022 | $0.22 | 0.0% | 0.30% |
| 2 | 043942935 | | EA | Hex - Fastening Nuts Type: Handy Hex Nut Height Weight Thread Size 4-24 Hex Height 1584 Material: Stainless Steel Fresh Coating Plain | $0.30 | $0.30 | $0.36 View History | $0.56 | $0.30 | 3.0% | 0.56% |
| 3 | 065542332 | 13102 | EA | Check Nut - Fastening Nuts Type: Check Lock Nut Thread Size 4-20 Outside Diameter ¾ Overall Height 7.03 Material: Carbon Steel Diameter 1.0 Head Thickness 8.02 | $2.85 | $2.95 | $3.00 View History | $3.02 | $2.85 | 0.5% | 0.56% |
| 4 | 045554399 | 14206 | EA | Check Nut - Fastening Nuts Type: Check Lock Nut Thread Size 4-24 Outside Diameter ¾ Overall Height 7.03 Material: Carbon Steel Diameter 1.0 Head Thickness 8.02 | $2.75 | $2.85 | $3.05 View History | $2.86 | $2.85 | 0.5% | 0% |
| 5 | 045556447 | 15322 | EA | Check Nut - Fastening Nuts Type: Check Lock Nut Thread Size 4-20 Outside Diameter ¾ Overall Height 7.00 Material: Carbon Steel Diameter 1.0 Head Thickness 8.02 | $2.05 | $2.05 | $3.00 View History | $3.02 | $2.85 | 3.0% | 3.96% |

FIG. 18

METHODS AND SYSTEMS TO MAINTAIN, CHECK, REPORT, AND AUDIT CONTRACT AND HISTORICAL PRICING IN ELECTRONIC PROCUREMENT

CROSS-REFERENCE TO RELATED APPLICATIONS

The present application is a continuation of and claims benefit of non-provisional application Ser. No. 13/309,109, entitled "Methods and Systems to Maintain, Check, Report, and Audit Contract and Historical Pricing in Electronic Procurement," filed on Dec. 1, 2011, which is herein incorporated by reference in its entirety, and which itself claims benefit of provisional application Ser. No. 61/418,947 entitled "Methods and Systems to Maintain, Check, Report, and Audit Contract and Historical Pricing in Electronic Procurement," filed on Dec. 2, 2010, which is herein incorporated by reference in its entirety.

TECHNICAL FIELD

The presently disclosed embodiments relate to electronic procurement tools and, more particularly, to methods and systems for auditing purchases and pricing to determine compliance with supplier contracts.

BACKGROUND

Organizations use electronic procurement systems to allow individuals to order items from supplier's catalogs. In certain circumstances, organizations have contracts with suppliers restricting the purchase of some items, setting approved pricing, and indicating that other items are preferred by the organization. As procurement systems become automated, organizations may lose control over purchases made by individuals in the organization and thus may desire tools to help ensure compliance with these contracts.

BRIEF SUMMARY

Disclosed embodiments provide computer-based procurement systems that allow an organization to audit purchases to monitor compliance with supplier contracts. Consistent with disclosed embodiments, a system is provided for initializing an audit for purchases in an electronic marketplace. In one aspect, the system includes a processor and a memory that includes instructions direct the processor to receive audit parameters including at least one baseline. The processor may also search at least one electronic supplier catalog to generate a plurality of available items based on the audit parameters and compare a price of at least one available item of the plurality of available items to a baseline for the available item. The processor may also generate a report of the price comparison.

In another embodiment, a system is disclosed for providing historical price information in an electronic marketplace. In one aspect, the system includes a processor and a memory that includes instructions direct the processor to receive a request for historical price information of requested items. The processor may also search a database storing a plurality of search items to retrieve historical listed prices of the requested items and also search the database storing the plurality of search items to retrieve historical purchased prices of the requested items. The processor may also generate a report of a result of the historical price information request.

In another embodiment, a system is provided for purchasing items from an electronic catalog. In one aspect, the system includes a processor and a memory that includes instructions direct the processor to receive a search request from a purchasing organization and receive contract information from the purchasing organization, the contract information including acceptable price information for a plurality of contract items. The processor may also search at least one supplier catalog to generate a list of a plurality of available items and prices of the available items based on the search request and adjust the price of at least one available item of the plurality of available items based on the contract information. In further aspects, the processor may also compare the price of each available item of the plurality of available items with the contract information and filter the list of the plurality of available items and prices of the available items based on whether the price of each available item is consistent with the contract information. Additionally, the processor may provide the filtered list of the plurality of available items and prices of the available items to the purchasing organization.

Consistent with other disclosed embodiments, tangible computer-readable storage media may store program instructions that are executable by a processor to implement any of the processes disclosed herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various embodiments and exemplary aspects of disclosed embodiments and, together with the description, explain disclosed principles. In the drawings:

FIG. 7 is an exemplary function and component responsibility matrix, consistent with disclosed embodiments;

FIG. 8 illustrates an exemplary audit setup interface, consistent with disclosed embodiments;

FIG. 9 illustrates an exemplary audit baseline setup interface, consistent with disclosed embodiments;

Figure 10:
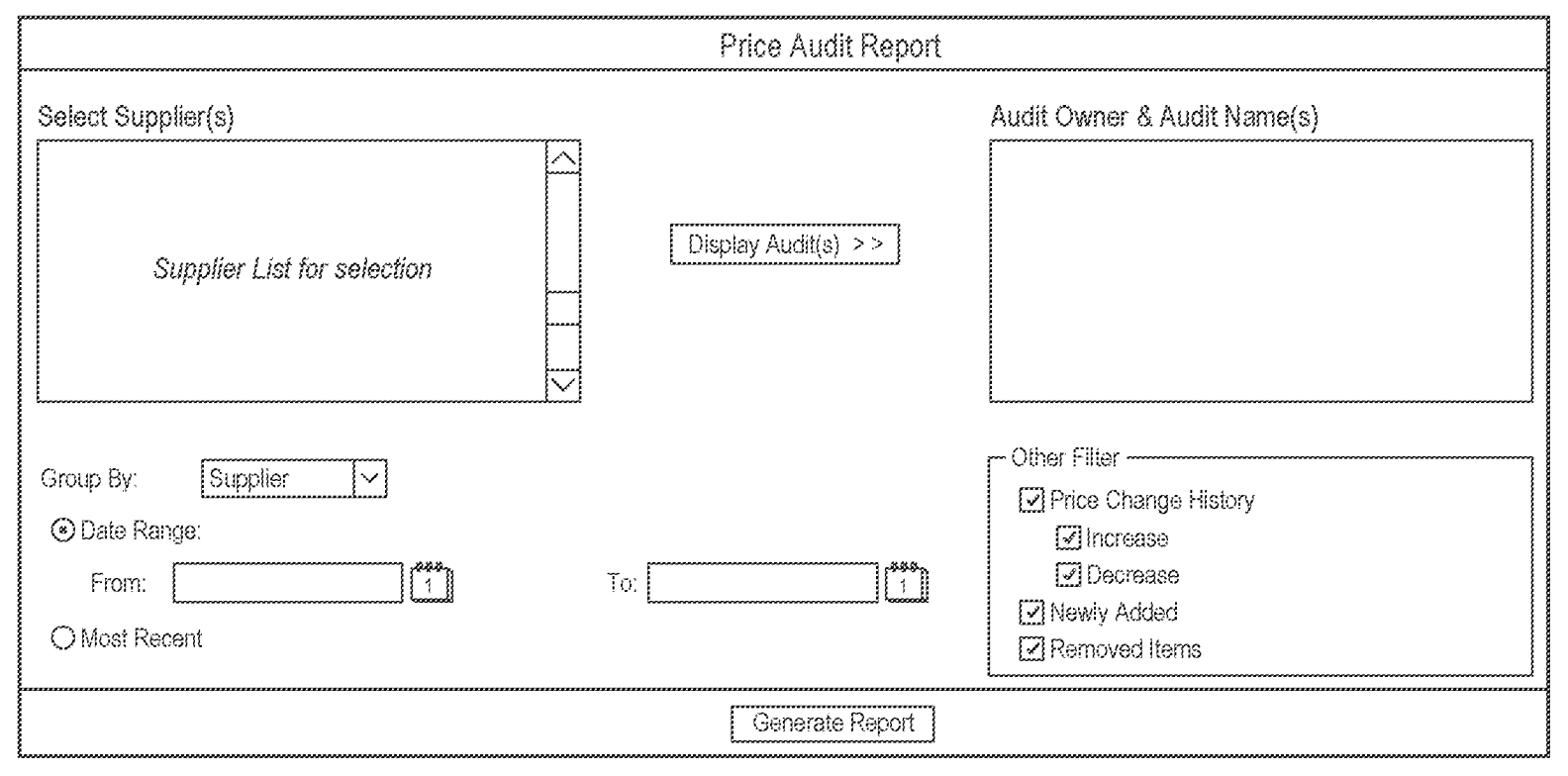

FIG. 10 illustrates an exemplary audit report request interface, consistent with disclosed embodiments;

FIG. 11 illustrates an exemplary audit summary report, consistent with disclosed embodiments;

FIG. 12 illustrates an exemplary audit detail report, consistent with disclosed embodiments;

FIG. 13 illustrates an exemplary contract mapping interface, consistent with disclosed embodiments;

FIG. 14 illustrates an exemplary contract upload mapping interface, consistent with disclosed embodiments;

FIG. 15 illustrates an exemplary display of contract upload information, consistent with disclosed embodiments;

FIG. 16 illustrates an exemplary interface for providing an audit snapshot, consistent with disclosed embodiments;

FIG. 18 illustrates an exemplary display of price change detail information, consistent with disclosed embodiments;

DESCRIPTION OF THE EMBODIMENTS

Figure 1:
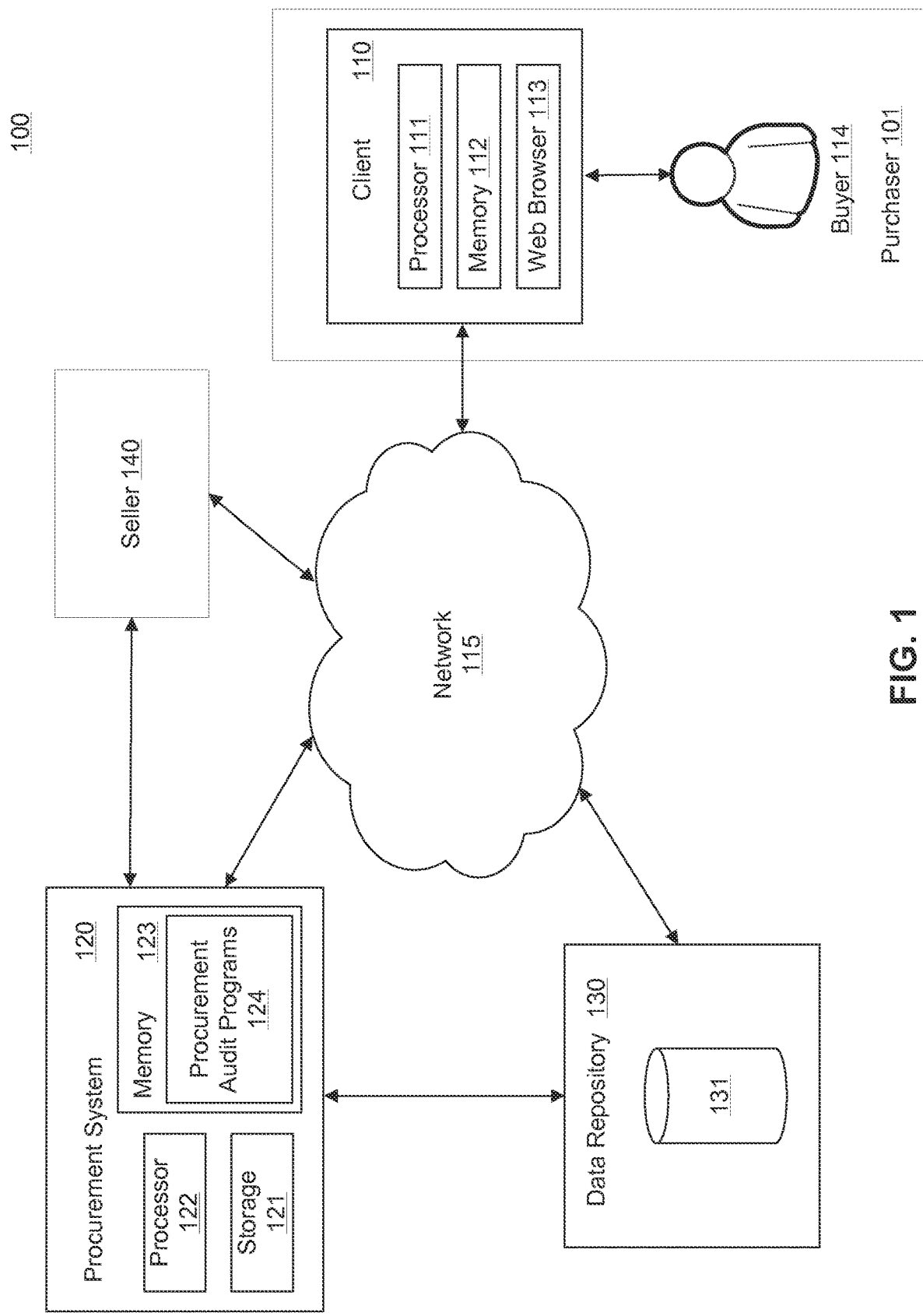
FIG. 1 is a diagram illustrating an exemplary system that may be used to implement disclosed embodiments.

Disclosed embodiments provide an electronic procurement tool that enables the buyer, or purchasing organization to audit the price of the catalog items that are purchased from their suppliers enabled through an electronic marketplace. The audit may be enabled using one or more mechanisms. One mechanism includes allowing the buyer to maintain a list of items that are part of the contract with their supplier(s) and the negotiated/contracted price along with acceptable price variations. Such contract management may be enabled regardless of whether content is accessed via local/static catalogs and supplier managed content, via punchout or similar technology or via eCommerce enabled web presence. Another mechanism is allowing the buyer to baseline a set of items from an electronic supplier catalog. A baseline is a selection of items that are normally procured from the supplier along with the list price and an acceptable 'tolerance' (acceptable price deviation on the list price). A third exemplary mechanism includes allowing the buyer to maintain historical price of every item that is searched for or purchased through the electronic marketplace. Another mechanism includes allowing the buyer to maintain a historical contract price of every item that is searched for or purchased through the electronic catalog, where the contract price for the item is calculated as a fixed discount from the prevailing Manufacturer's Standard List Price (MSRP), or similar, at the time.

The price history and the contract/baseline price maintained by disclosed embodiments may allow the user to check if the user's purchase through the marketplace complies with the contract and/or baseline price; receive alerts on non-contracted purchases made by the end users in real-time, in terms of non-contracted items as well non-contracted price; receive periodic alerts on non-contracted items showing up in supplier catalogs based on scheduled audit programs; view reports that show suppliers that comply with the contracts as well as suppliers that don't, along with relevant item level details; view detailed analytical reports on price trends and deviations of catalog line items; and use the historical price maintained by the system in order to setup a 'regular' or 'normal' purchase price for an item and use it as a baseline price for all reporting/alerting purposes.

Disclosed embodiments may maintain the price information of a supplier catalog item along with the time at which the item showed up in the search results and/or shopping cart for a certain period of time that is configurable (typically, 12 months). Disclosed embodiments may also maintain the price at which the catalog item was purchased by the end user through the electronic marketplace, with purchase being defined as return of the user's active shopping cart from the marketplace to the user's electronic procurement system or export of the user's active shopping cart in Excel/other formats. The purchase price of an item may be different from the list price at which it appeared in the supplier catalog due to supplementary price rules, special promotional offers, discount rules, and other business rules.

The price and purchase history generated and maintained by disclosed embodiments may allow the user to view the 12 months price information of a supplier catalog item in the search results and shopping cart pages, in the form of a chart; view the average, high, low and most recent price of a supplier catalog item in the search results and shopping cart pages; check the number of times the supplier catalog item appeared in searches prior to the current search instance in which it appeared; view information on the number of times the catalog item was purchased by other users and the purchase price; view the audit baseline price for the supplier catalog item, if there is an active price audit baseline for the item; view the contract price for the supplier catalog item, if the item is listed in the contract information within an electronic marketplace; review any shopping restriction placed by the administrator of the user's organization based on historical price, audit baseline and/or contract price.

FIG. 1 is a diagram illustrating an exemplary electronic procurement audit system that may be used to implement disclosed embodiments, including exemplary system components. The components and arrangement, however, may be varied.

Procurement system 120 may include a processor 122, a memory 123, input/output (I/O) devices (not shown), and a nonvolatile storage 121. Procurement system 120 may be implemented in various ways. Procurement system 120 may be a general purpose computer, a server, a mainframe computer, or any combination of these components. Procurement system 120 may communicate over a link with network 115. For example, the link may be a direct communication link, a LAN, a WAN, or other suitable connection. Procurement system 120 may be standalone or it may be part of a subsystem, which may, in turn, be part of a larger system, such as a legacy procurement system.

Processor 122 may be one or more known processing devices, such as a microprocessor from the Pentium™ or Xeon™ family manufactured by Intel™ or the Turion™ family manufactured by AMD™. Memory 123 may be one or more storage devices configured to store information used by processor 122 to perform certain functions related to disclosed embodiments. Storage 121 may be a volatile or non-volatile, magnetic, semiconductor, tape, optical, removable, nonremovable, or other type of storage device or tangible computer-readable medium. In one embodiment, memory 123 may include one or more procurement audit programs or subprograms 124 loaded from storage 121 or elsewhere that, when executed by procurement system 120 or another processor, perform various procedures, operations, or processes consistent with disclosed embodiments.

For example, memory 123 may include a contract setup program that, when executed by processor 122, enables quick entry of contract data; an audit setup and baseline program that, when executed by processor 122, schedules an audit of a supplier and identifies items from the supplier catalog used to conduct the audit; a price history maintenance program that, when executed by processor 122, saves the price of items purchased using the electronic marketplace and displays the price history of an item, statistics relating to item purchases; a multi-item price comparison program that, when executed by processor 122, allows users to compare prices for two or more items; a price-based shopping restriction program that, when executed by processor 122, enforces price restrictions when an item is purchased; a reporting program that, when executed by processor 122, creates reports from the price, contract, and audit data; and an integrative support program that, when executed by processor 122, links the other programs and allows them to use a common database, provides a common user interface, performs basic bookkeeping tasks, (such as storing the user's input, etc.), and provides user guidance and help. Memory 123 may also include other programs that, when executed by processor 122, perform other functions and processes, such as programs that provide communication support, Internet access, etc.

Methods, systems, and articles of manufacture consistent with disclosed embodiments are not limited to separate programs or computers configured to perform dedicated tasks. For example, memory 123 may be configured with procurement audit program 124 that performs several functions when executed by processor 122. For example, memory 123 may include a one or more programs 124 that performs procurement audit functions consistent with certain disclosed embodiments. Moreover, processor 122 may execute one or more programs located remotely from procurement system 120. For example, procurement system 120 may access one or more remote programs that, when executed, perform functions related to disclosed embodiments.

Memory 123 may be also be configured with an operating system (not shown) that performs several functions well known in the art when executed by procurement system 120. By way of example, the operating system may be Microsoft Windows™, Unix™, Linux™, Solaris™, an Apple Computers operating system, Personal Digital Assistant operating system such as Microsoft CE™, or some other operating system. The type of operating system, and even to the use of an operating system, is not critical to any disclosed embodiment.

Procurement system 120 may include one or more I/O devices (not shown) that allow data to be received and/or transmitted by procurement system 120. I/O devices may also include one or more digital and/or analog communication input/output devices that allow procurement system 120 to communicate with other machines and devices. Procurement system 120 may receive data from external devices and output data to external devices via I/O devices. The configuration and number of input and/or output devices incorporated in I/O devices may vary as appropriate for certain embodiments.

Procurement system 120 may also be communicatively connected to one or more data repositories 130 either directly or indirectly, such as through network 115. Data repository 130 may include one or more databases 131 that store information, such as catalogs, contract data, purchases, searches, usage data, and audit baselines, and are accessed and/or managed through procurement system 120. By way of example, the databases may be Oracle™ databases, Sybase™ databases, Microsoft™ SQL Server databases, or other relational databases. The databases may include, for example, data and information related to searches performed, item purchases, supplier contracts, supplier catalogs, price restrictions, price tolerances, audit setup, etc. Systems and methods of disclosed embodiments, however, are not limited to separate databases or even to the use of a database.

Procurement analysis server 120 may be communicatively connected to one or more sellers 140. Seller 140 may be a computer system associated with a seller (or other type of entity) that executes processes through one or more processors. In one embodiment, seller 140 may include a computer system that generates, stores, and maintains information, such as items from the seller's electronic catalog and other information that allows seller to provide information used by other systems or users to display, select, purchase and view items from the seller's electronic catalog.

Procurement system 120 may also be communicatively connected to one or more clients 110 through network 115. Client 110 may be a computer system associated with a purchaser 101 that may be an entity that, through computer systems, selects and purchases items from seller 140 (or other entities) electronically, such as on-line or other forms of electronic procurement. Client 110 may include one or more processors 111, a memory 112, and a web browser 113 (or similar software that presents information received over network 115) that enable it to communicate with procurement system 120 and seller 140. Procurement system 120 may send data to client 110, and web browser 113 (or similar software) may display the data. For example, based on data received from procurement system 120 and/or seller 140, web browser 113 may render search results, reports, audit setup, price restriction setup, contract setup, etc. In some embodiments, procurement system 120 may render the search results, reports, or input screens to web browser 113 for display. In other embodiments, procurement system 120 may send the data used to create a search result list, a report, or an input screen to client terminal 110 and client terminal 110 may render the appropriate display. Client terminal 110 may be used by a buyer 114 to audit items purchased from seller 140 through procurement analysis server 120. Buyer 114 may represent one or more users associated with purchaser 101. In other embodiments, a buyer may use a client 110 that is not associated with a purchasing entity (such as purchaser 101). For instance, a user may operate a computer system (not shown) independent of purchaser 101 that interacts with procurement system 120 and/or seller 140 through network 115. Moreover, in other embodiments, client 110 may be a mobile computer system, such as a laptop or mobile smart device (e.g., iPhone™, iPad™, Blackberry™, etc.), that is used by buyer 114 who is remotely located from purchaser 101. For example, buyer 114 may represent a user who works for purchaser 101 and is traveling and is remotely located from his office. Buyer 114, through client 110, may interact with procurement system 120 while remotely located from his office, in a manner consistent with the disclosed embodiments. Buyer 114 may reflect an administrator user that has different access rights compared to other types of users to data and processes implemented by procurement system 120. An administrator may access and interact with administrator type processes following security measures, such as a password, or other forms of identification mechanisms.

Client terminal 110 may send data to procurement system 120 indicating selection of items for purchase, search terms, contract terms, price restrictions, report requests, etc. Client terminal 110 may include I/O devices (not shown) to enable communication with an individual. For example, the I/O devices may include one or more input devices, such as a keyboard, touch screen, mouse, and the like, that enable client terminal 110 to receive data from a user, such as search and filter parameters, report requests, contract requirements, audit parameters, etc. Further, client terminal 110 may include I/O devices that communicate with one or more output devices, such as a display screen, CRT monitor, LCD monitor, plasma display, printer, speaker devices, and the like, that enable client terminal 110 to present data to a user.

Figure 2:
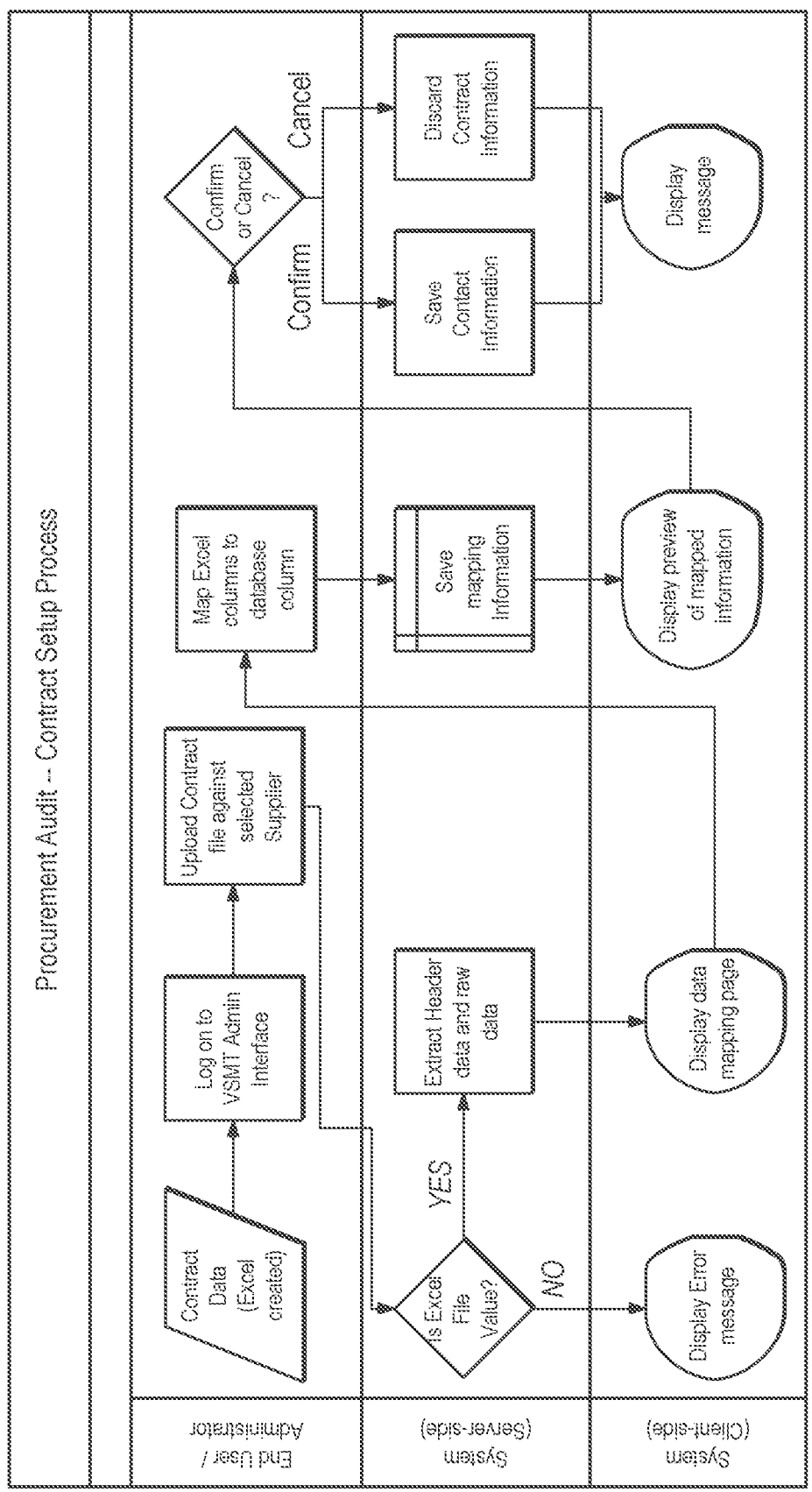
FIG. 2 is a flow diagram illustrating an exemplary contract setup process, consistent with disclosed embodiments.

FIG. 2 is a flow diagram illustrating an exemplary contract setup process, consistent with disclosed embodiments. A user, such as, for example, buyer 114, can setup contract data associated with purchasing items from seller 140. As shown, and in one example, "End User/Administrator" reflects processes performed by a user (e.g., buyer 114), "System (Server-side)" reflects processes performed by procurement system 120, and "System (client-side)" reflects processes performed by client 110.

In one aspect, an "end user" may represent that the action is performed by a person using the procurement system. A buyer may refer to a type of end user who may, for example, search and shop for items sold by, for example, seller 140. An administrator may refer to a type of end user who performs configuration, administrative, and other system related functions on behalf of buyers and/or a purchasing organization, such as purchaser 101.

In one embodiment, the buyer may configure contract data by uploading a document or file, such an Excel™ file, or any other type of document or file. In one embodiment, the document or file may reflect a contract and/or contract terms that may, for example, include the following information: a) Supplier Part Number; b) Unit of Measure; and c) Contract Price. Other information may also be included, such as d) Tolerance (acceptable price deviation in terms of % value); e) Short description of item; f) Effective date of contract price of the item; g) Expiration date of contract price of the item; h) Buyer's reference number for the item; i) Manufacturer part number; and j) fixed discount off Manufacturer's Standard List Price (MSRP).

Once the document or file is prepared, the buyer, using client terminal 110 in connection with procurement system 120, may upload the contract file, map document or file information to database fields (e.g., map Excel™ columns to database fields), preview the uploaded information and confirm the upload as shown in FIG. 2. These processes may be performed by software executed by a processor with or without user interaction.

Figure 3:
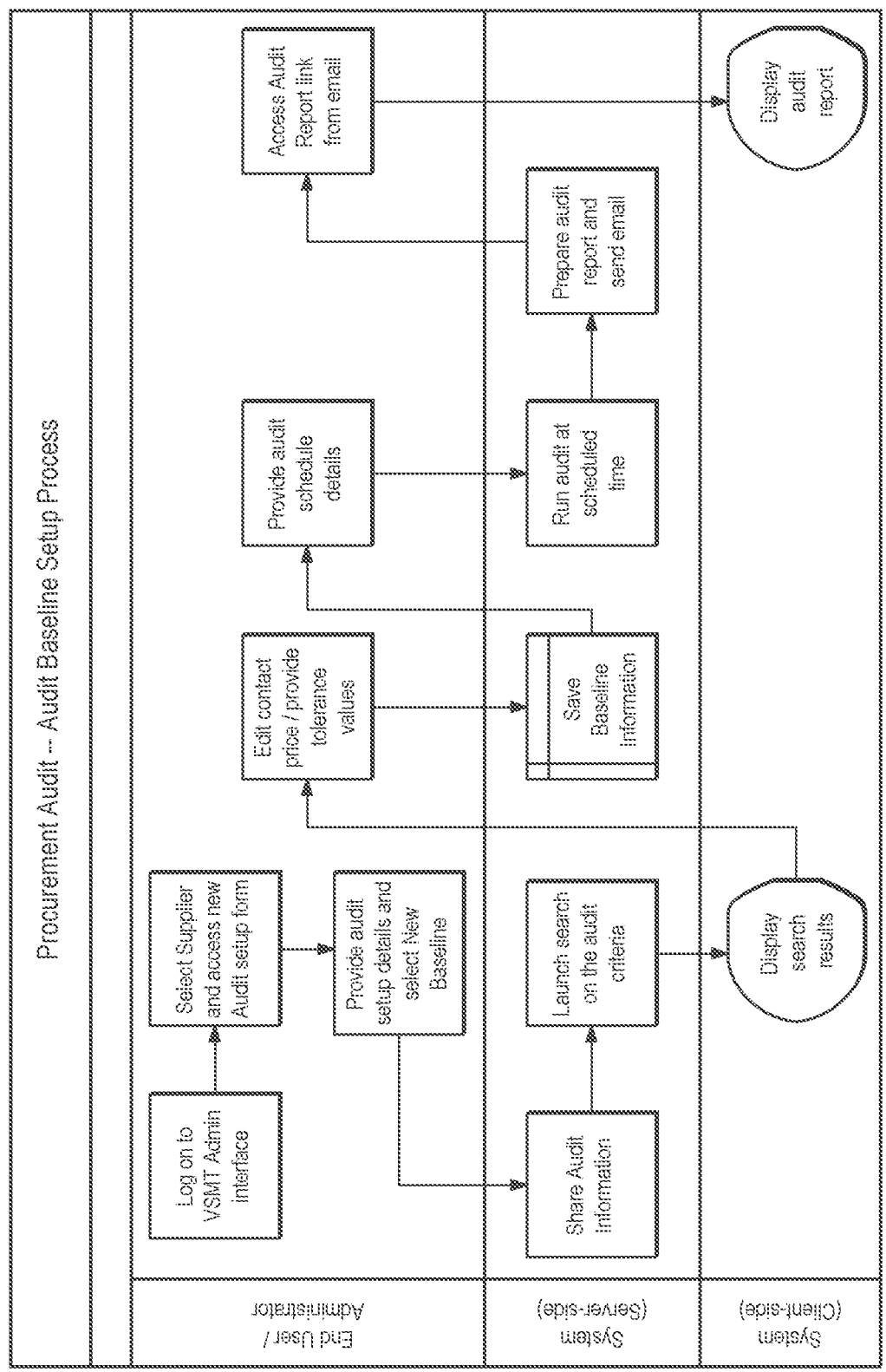
FIG. 3 is a flow diagram illustrating an exemplary audit baseline setup process, consistent with disclosed embodiments.

FIG. 3 is a flow diagram illustrating an exemplary audit baseline setup process, consistent with disclosed embodiments. As shown, and in one example, "End User/Administrator" reflects processes performed by a user (e.g., buyer 114), "System (Server-side)" reflects processes performed by procurement system 120, and "System (client-side)" reflects processes performed by client 110. In one embodiment, the buyer can setup a scheduled audit to check the regular/contract price of external supplier catalog items. The audit parameters, such as what to check and when to perform the audit may be stored on procurement system 120 using, for example memory 123, storage 121, or data repository 130. The process of setting up the baseline may be performed using software executed by a processor.

In one embodiment, the buyer may select a supplier (external, web catalog supplier enabled through an electronic marketplace), specify a search term (keyword, part number etc.) and launch a search. Disclosed embodiments may bring search results real-time from the external supplier catalog and show the results in another form, such as a table or other format. Values within the results may be editable, such as the price. In one embodiment, the buyer can choose to retain the price values displayed or edit them to reflect a pre-negotiated, contract price. Using an interface to procurement system 120, the buyer may also choose to specify a tolerance against individual line items or all the line items in the form of a percentage value. Procurement system 120 may be configured to receive this type of information, such as line item price values, and process the information according to processes consistent with the disclosed embodiments.

The line item price along with the tolerance represents the 'acceptable' price for the item. The line item price may be, for example, fixed, or calculated, based on a published Manufacturers Standard List Price (MSRP) combined with a fixed discount. In one aspect, a baseline is a set of items from the external supplier catalog along with their acceptable prices at a certain point in time (the time of baseline). The procurement system allows the buyer to provide a name to the baseline for later referencing and to set up a schedule (e.g., daily, weekly or monthly) for the system to audit the baseline.

When the scheduled time for an audit occurs, procurement system 120 may perform the following functions: a) Bring real-time search results for the search term setup in the baseline from the same supplier catalog; b) Compare the real-time price against the baselined acceptable price and note the differences; c) Identify real-time search result items that are not part of the baseline (new items); d) Identify baselined items that are not part of the real-time search results (deleted items); and e) Prepare a report and send the report through email to a distribution list configured at the time of baseline.

In one embodiment, procurement system 120 may send the buyer the price audit report at scheduled intervals so the buyer may review price differences, newly added items, and deleted items. The buyer may use procurement system 120 to configure any number of baselines with different schedules for the same supplier.

Figure 4:
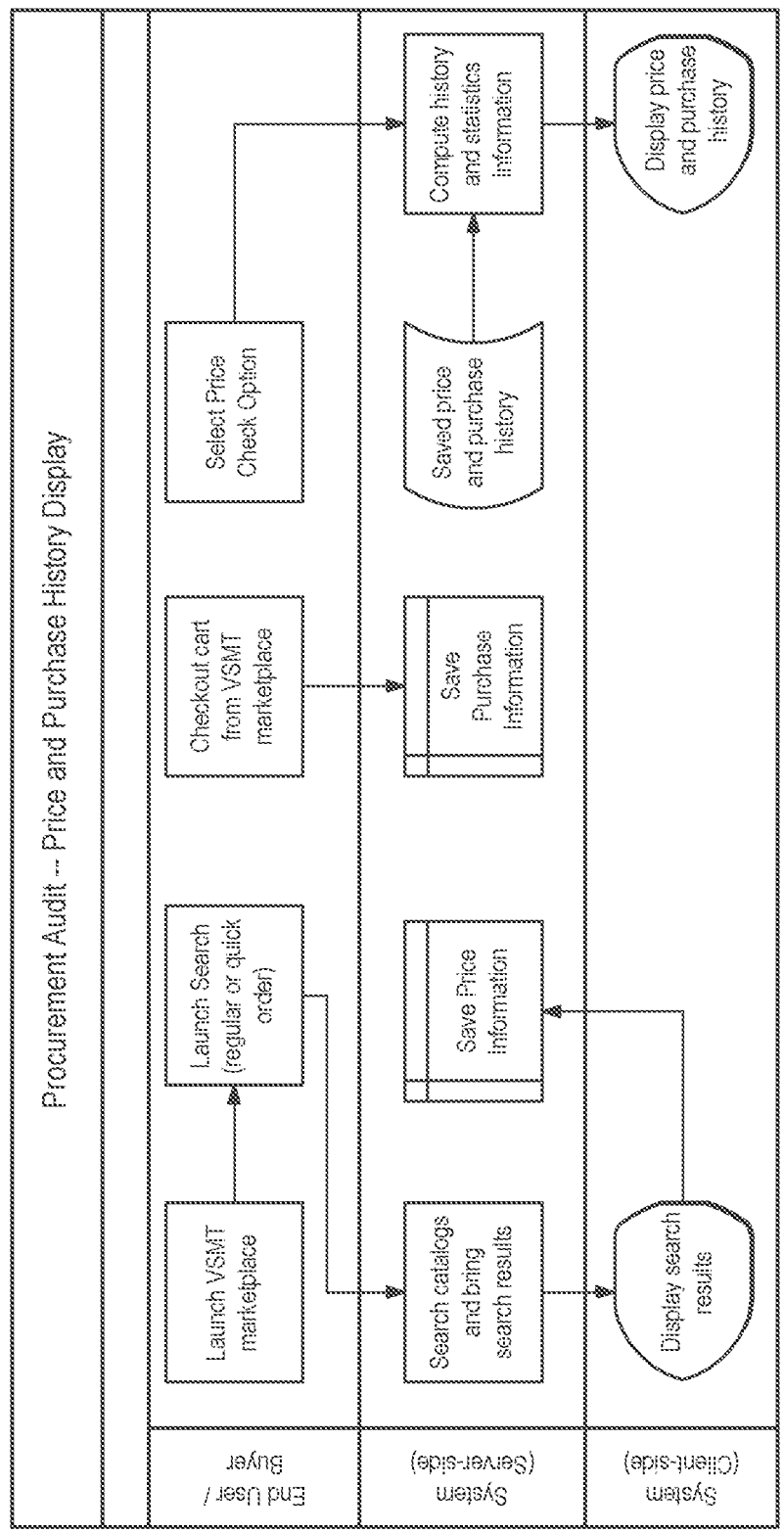
FIG. 4 is a flow diagram illustrating an exemplary price and purchase history display process, consistent with disclosed embodiments.

FIG. 4 is a flow diagram illustrating an exemplary price and purchase history display process, consistent with disclosed embodiments. As shown, and in one example, "End User/Buyer" reflects processes performed by a user (e.g., buyer 114), "System (Server-side)" reflects processes performed by procurement system 120, and "System (client-side)" reflects processes performed by client 110. Procurement system 120 may maintain the price of every catalog item that appears in the returned results of a search, regardless of the source of the results (e.g., a local database based catalog, or a remote third party website) or how the search was initiated (e.g., via a search term entered by a user, or prepopulated list of terms). Procurement system 120 may also maintain a history of every single purchase (purchase is defined as a checkout from an electronic marketplace back to the buyer's electronic procurement system).

The price and purchase history information may be displayed to the end user such as buyer 114, on demand, when the user selects the 'Price Check' link against a search result or a shopping cart item. The Price Check component (e.g., software executed by a processor) may display the following information: (a) Price history from the saved history in the form of a graph; (b) Price statistics in terms of average, maximum, least and most recent price; (c) Contract and/or baseline price data, if available for the selected item; and (d) Purchase history in terms of the number of times the item was purchased and the purchase price.

Figure 5:
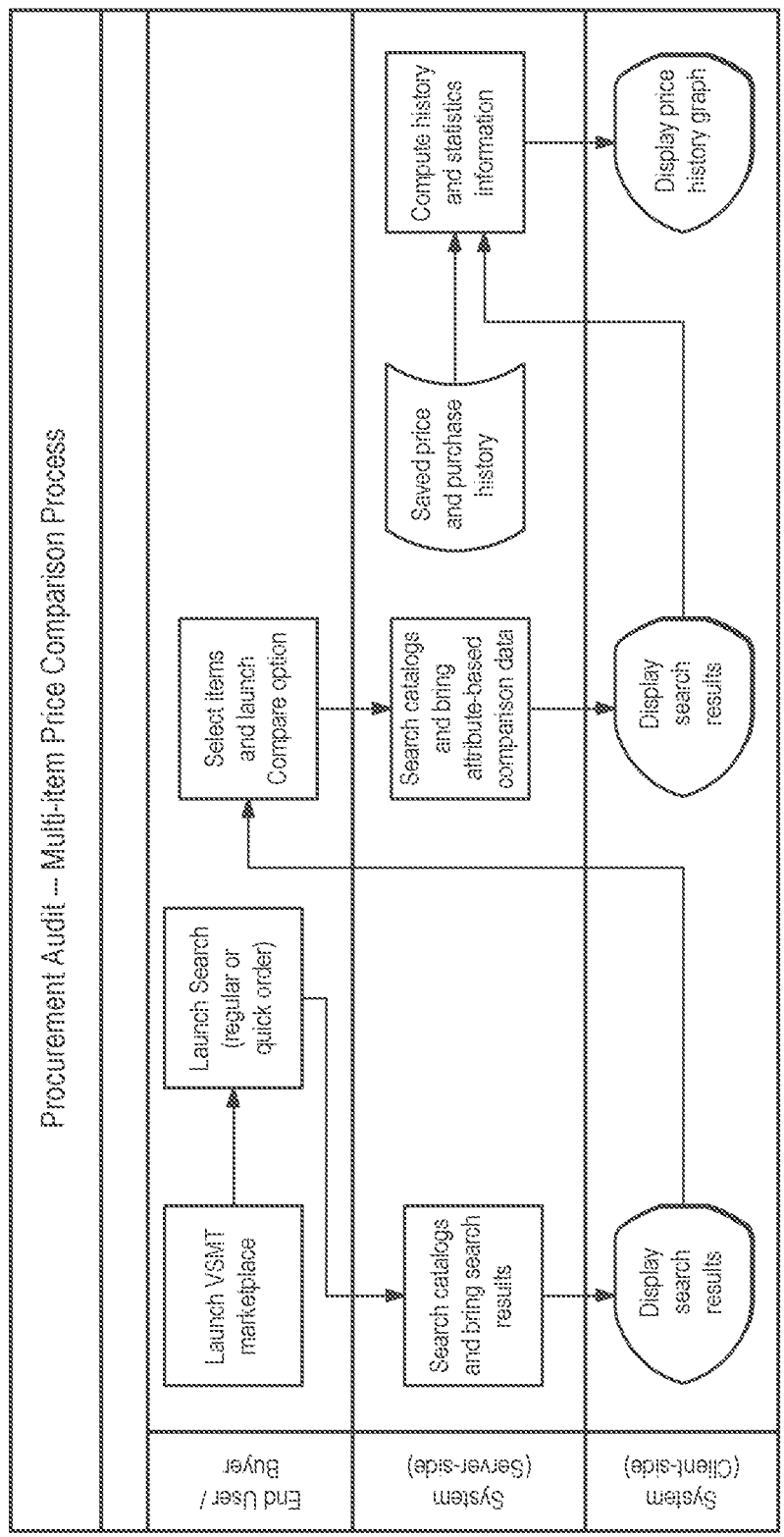
FIG. 5 is a flow diagram illustrating an exemplary price comparison process, consistent with disclosed embodiments.

FIG. 5 is a flow diagram illustrating an exemplary price comparison process, consistent with disclosed embodiments. As shown, and in one example, "End User/Buyer" reflects processes performed by a user (e.g., buyer 114), "System (Server-side)" reflects processes performed by procurement system 120, and "System (client-side)" reflects processes performed by client 110. In some embodiments, procurement system 120 may allow the end user (e.g., buyer 114 via client 110) to select two or more items from the search results page of an electronic marketplace and then select a Compare option. Alternatively procurement system 120 may allow the end user to select two or more items from the shopping cart page of an electronic marketplace and then select the Compare option. The compare option (performed via software executed by a processor) may generate information that is used to display a user interface (e.g., a web page, window, etc.) with 2 tabs—Attribute Comparison and Price Comparison. The Attribute Comparison tab may include information reflecting a comparison of selected items based on long description, manufacturer name, item specification, product image and other available fields/attributes of the catalog items. In one embodiment, procurement system 120 may execute software that performs processes that generates the comparison data reflected in the displayed tabs. For instance, system 120 may execute processes that compare data from the catalog information provided by seller 140.

In one example, the Price Comparison tab may show a graph with historical price of selected items in the form of trendlines for a pictorial price comparison. The tabs may allow end users to select one or more items from the compare page to add to the shopping cart. In one embodiment, procurement system 120 may execute software that performs processes that generate the graphs (and other displayed charts, etc.) rendered in the price comparison tab. Thus, procurement system 120 may execute a process that determines trends from the price information obtained from the seller 140 (or other sources of data). The trends may be determined using algorithms and/or processes that are well known to one of ordinary skill in the art.

Figure 6:
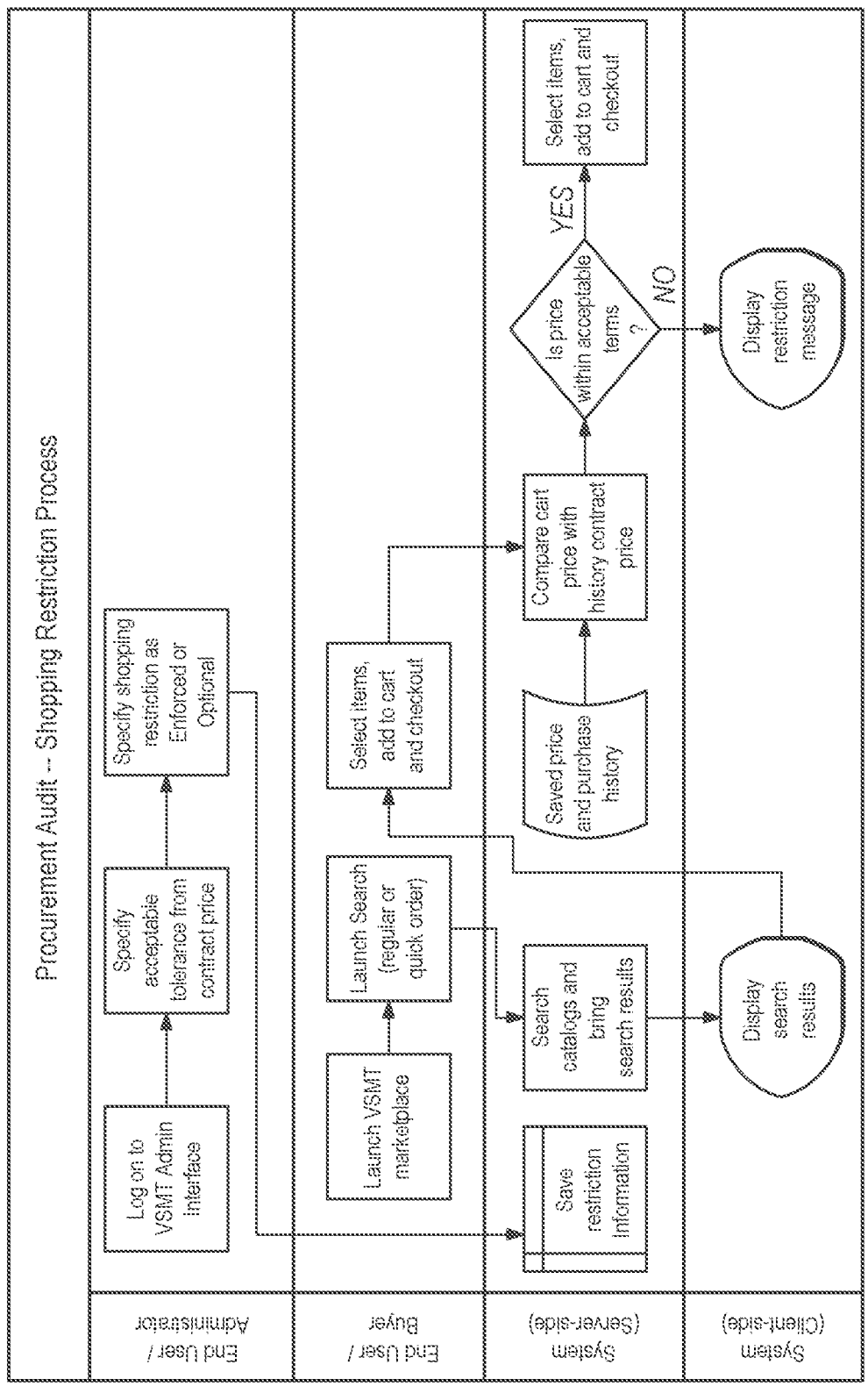
FIG. 6 is a flow diagram illustrating an exemplary shopping restriction process, consistent with disclosed embodiments.

FIG. 6 is a flow diagram illustrating an exemplary shopping restriction process, consistent with disclosed embodiments. As shown, and in one example, "End User/Buyer" reflects processes performed by a user (e.g., buyer 114), "End User/Administrator" reflects processes performed by an administrator user associated with a purchasing entity (e.g., purchaser 101), "System (Server-side)" reflects processes performed by procurement system 120, and "System (client-side)" reflects processes performed by client 110. Disclosed embodiments may allow the buying organization to place restrictions on purchases made by end users based on contract/baseline price. In such embodiments, the buyer may determine the allowable deviation of the real-time/shopping cart price from the contract/baseline price (contract price and baseline price as defined in above sections). For example, the buyer can determine that the allowable deviation is 10%, i.e. the real-time/shopping cart price of any item purchased by end users should not exceed by more than 10% of the contract/baseline price. In one embodiment, the contract/baseline price could be a fixed price or a calculated price based on the published Manufacturer's Standard List Price (MSRP) combined with a fixed discount.

Disclosed embodiments may allow the buyer to enable the shopping cart restriction by turning a shopping restriction flag ON in the electronic marketplace settings (accessible via appropriate access rights) provided by procurement system 120 and entering the allowable deviation as a percentage value. The buyer may then choose to either enforce the restriction or only provide a warning to the end user. In certain embodiments, procurement system 120 may, at the time of checkout from a shopping cart, check every cart item's price against a contract/baseline price, if available and determine the deviation, if any. If procurement system 120 determines that the deviation is more than an allowable limit (e.g., above or below a determined threshold value), then it may generate information to display data (e.g., a Shopping Restriction page) indicating the items that deviate along with price and contract/baseline information. Procurement system 120 may be configured to enforce a shopping restriction (e.g., through the shopping restriction flag), which may not allow the user to check out the conflicting items. If the shopping restriction is not enforced, then procurement system 120 may generate a warning message for display to the user reflecting the deviation and provide a mechanism to allow the user to checkout, if desired. Shopping restrictions may not apply if contract or baseline information is not available for a line item. In other aspects, procurement system 120 may consider the tolerance values whenever the contract or baseline price is referenced to determine deviations. For example, procurement system 120 may perform processes that, when executed by a processor, collects, analyzes and generates results for determining whether prices deviate from determined tolerance values.

FIG. 7 is an exemplary function and component responsibility matrix, consistent with disclosed embodiments. FIG. 7 maps the various functions associated with one or more disclosed embodiments to exemplary actors that may be responsible for carrying out the function.

In one aspect, the first column of the chart in FIG. 7 reflects processes that may be performed by certain entities, users, or components, such as those listed in the first row (e.g., Customer (User), Customer (Administrator), Client Browser, (Application Server), and (Database Server). These entities, users, or components may be an "Actor" or a "Participant" in the disclosed processes. In one embodiment, an 'Actor' may be responsible in initiating and/or executing a function by selecting, computing, manipulating, rendering or otherwise triggering the functionality. A 'Participant' may participate in a function or process by, for example, providing support to the actor by storing or retrieving data, transmitting information or otherwise acting as a medium or helper in executing the functionality. As shown, and in one example, an "Customer (User)" reflects a user (e.g., buyer 114), "Customer/Administrator" reflects an administrator user associated with a purchasing entity (e.g., purchaser 101), "Client Browser" reflects software (and associated hardware that executes the software) that may be executed by client 110, "Application Server" is a processor associated with procurement system 120, and "Database Server" is a processor associated with data repository 130 (that may be included with procurement system 120).

Software executed by a processor, such as processor 122, may perform the report process to generation information to provide different types of reports. For example, disclosed embodiments of procurement system 120 may include a Price Velocity Reporting Process. In such embodiments, procurement system 120 allows buying organizations to view reports on the price velocity (price changes over a period of time) of catalog items belonging to any supplier for any time period. Users with appropriate access rights may select the supplier and indicate a date range for which the report is desired. In response, procurement system 120 may retrieve, from the historical price data, the median, high, low and most recent price of all items that came up in search results and quick order results from the selected supplier in the selected date range. The system may generate data to display the difference between the most recent price and contract/baseline price, if available, for a comparative view.

The system may allow the buyer to view the entire price history of any item showing up in the report. The price history is a list of the date/time of the occurrence of the catalog item and the price at that time. Using the system, the buyer can choose to refine the displayed report based on various criteria like items beyond contract pricing, items not in contract etc. The buyer may also choose to export the displayed report in a particular document or file format, such as an Excel™ format or other file formats, for offline use.

Disclosed embodiments of procurement system 120 may also include a Contract Compliance Reporting Process. In such embodiments, procurement system 120 allows buying organizations to view reports on level of compliance of suppliers with the contract information (as entered in the system by the process described above). The system may then allow the buyer to select a supplier and a date range to view the compliance report. The list of suppliers available for the report may be only those set of suppliers for which the contract information is loaded into the system.

Procurement system 120 may generate different reports. For example, system 120 may generate two graphical reports. The first may be a graph indicating the percentage of items in the report period that had a price increase, price decrease, or no change in their price relative to the contract price. The second may be a graph indicating the percentage of items in the report period that were part of the contract and items not in the contract. Procurement system 120 may generate information that creates a tabular listing of items relevant to each category that may be accessible to a user by clicking the appropriate section in the graph. The tabular listing may show item information with an indication of the price in relation to the contract price. The system may further allow the buyer to export the displayed table in a particular file format, such as an Excel™ format, for offline use.

An example of scheduling and running audits in an on-line procurement audit system consistent with certain disclosed embodiments is disclosed in connection with FIGS. 8-12. A user in an organization may set up any number of audits for a supplier and select a schedule for each audit. In one example, procurement system 120 may generate data to receive data for setting up an audit, like that shown in FIG. 8. After receiving the audit scheduling information, such as the information shown in FIG. 8, system 120 may save the information for later use either in memory 123 or data repository 130.

For each audit, the user may select items from the supplier's catalog for a baseline. For each item in the baseline, the user may review the price of the catalog item and update the price as required. FIG. 9 may represent an interface generated by procurement system 120 to view and update prices. The system may also allow the user to enter tolerance values for each catalog item, as shown in FIG. 9. Items may also be removed from the baseline of the audit.

Procurement system 120 may also generate price audit reports in response to a request for such a report from a user. Procurement system 120 may generate a display, such as the one shown in FIG. 10, for requesting a price audit report. In response to parameters supplied using a request screen such as the one shown in FIG. 10, procurement system 120 may create a summary report, such as the one shown in FIG. 11. In addition, procurement system 120 may create a detail price report, such as the one shown in FIG. 12. Procurement system 120 may generate data for a detail price report, and may send the report to buyers at requested intervals. Such a report may contain details on items that have a price different from that of the baseline price, new items available in the supplier catalog, as well as other information.

An example of managing contract information in an on-line procurement audit system consistent with certain disclosed embodiments is disclosed in connection with FIGS. 13-15. Procurement system 120 may generate a display, such as the one shown in FIG. 13, to allow buyers to maintain contract data, review, add, and discard contract information. Procurement system 120 may provide the capability to map columns from a spreadsheet file to the destination fields in a database storing contract information. Such a capability may allow the buying organization to maintain custom templates. The mapping capability may be provided through an interface such as the one shown in FIG. 14. When a user uploads data from a file (e.g., a spreadsheet), the system may provide an indication of what records the system successfully loaded into the database and what records failed to load. Such feedback may be provided, for example, using a display such as the one shown in FIG. 15.

Figure 16:
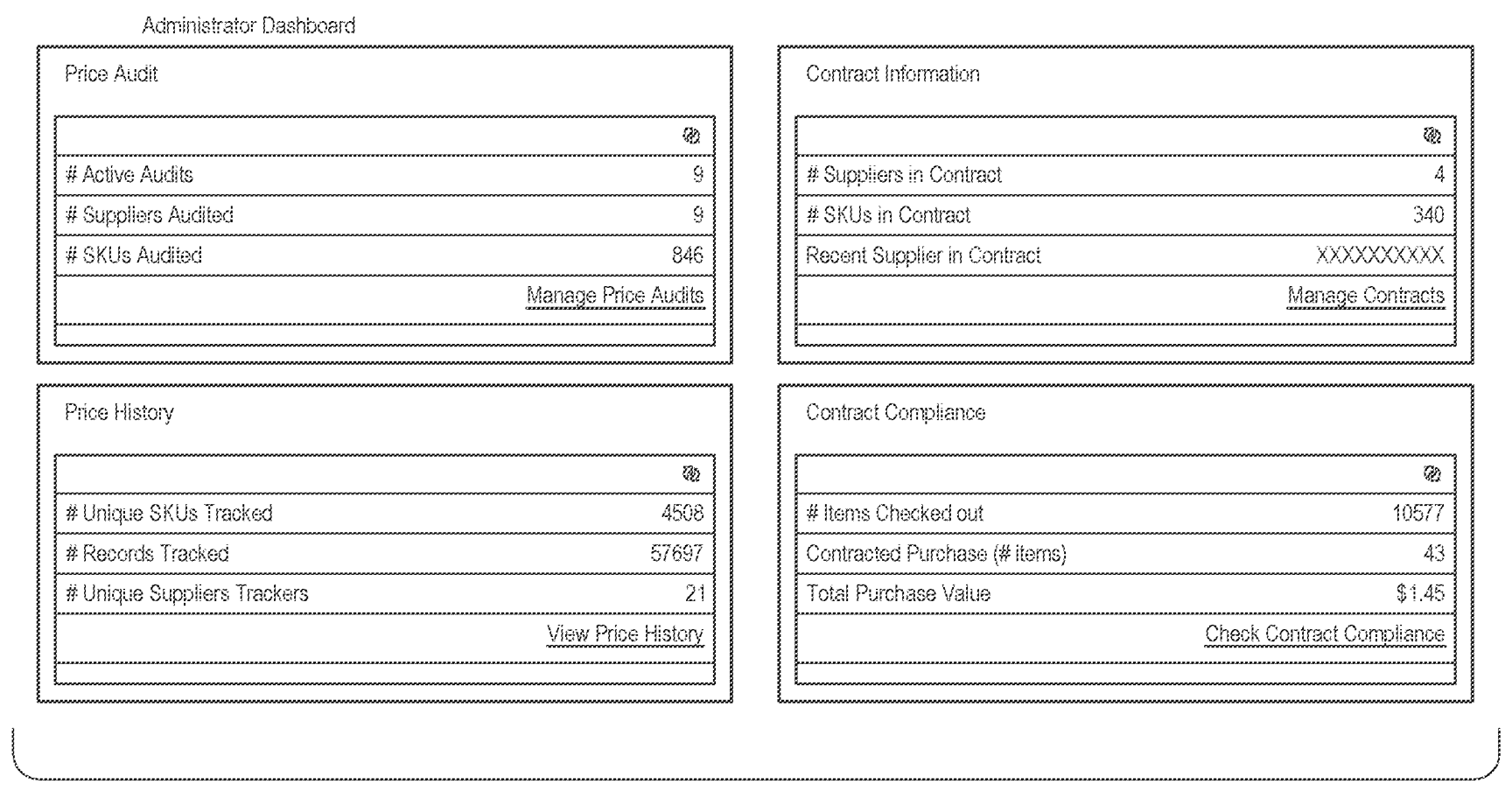

FIG. 16 illustrates an exemplary interface for providing an audit snapshot, consistent with disclosed embodiments. In certain embodiments, procurement system 120 generates information that is represented in an interface, such as the one shown in FIG. 16. Such an interface may include audit, contract, price history, and compliance data and provide access to setup and maintenance features available through the procurement system 120.

Figure 17:
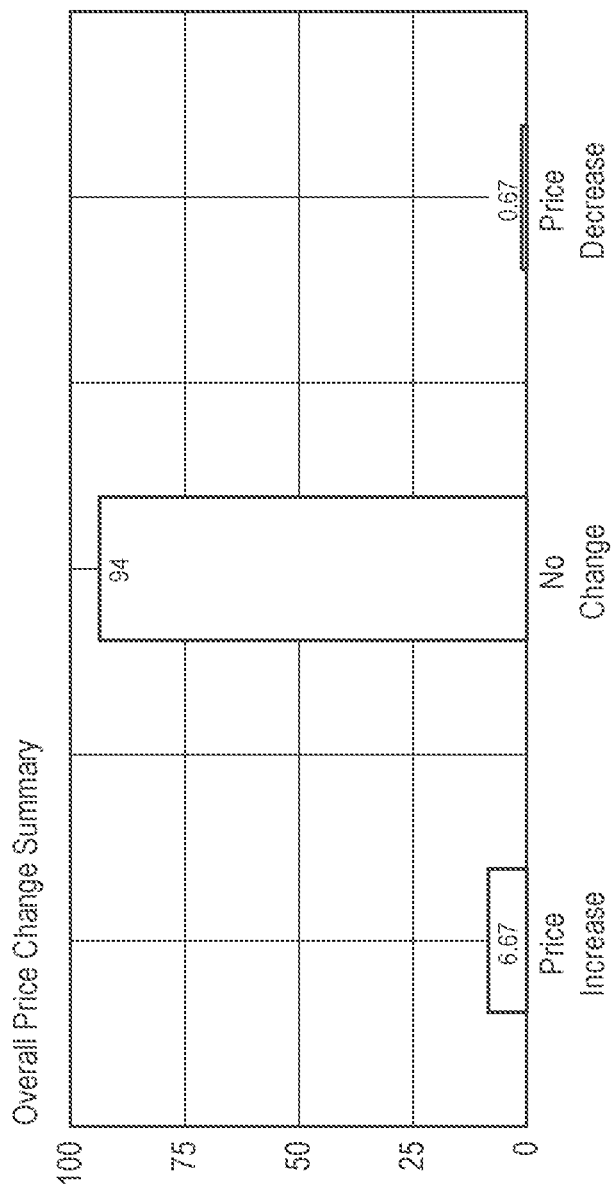
FIG. 17 illustrates an exemplary display of price change summary information, consistent with disclosed embodiments.

Procurement system 120 may provide several audit reports for managing contract information in an on-line procurement audit system. Procurement system 120 may generate a contract compliance report showing a price change summary, such as the report shown in FIG. 17. Such a report may display a graph indicating the percentage of items that have a price increase, a price decrease, or no change in price during the reporting period. The price change may be relevant to the contract price or a baseline price. Procurement system 120 may also generate a price change details report, such as the report shown in FIG. 18. This contract compliance report may show details on items that have price changes, such as the details shown in FIG. 18. Other details not shown in FIG. 18 may also be included in such a report.

Figure 19:
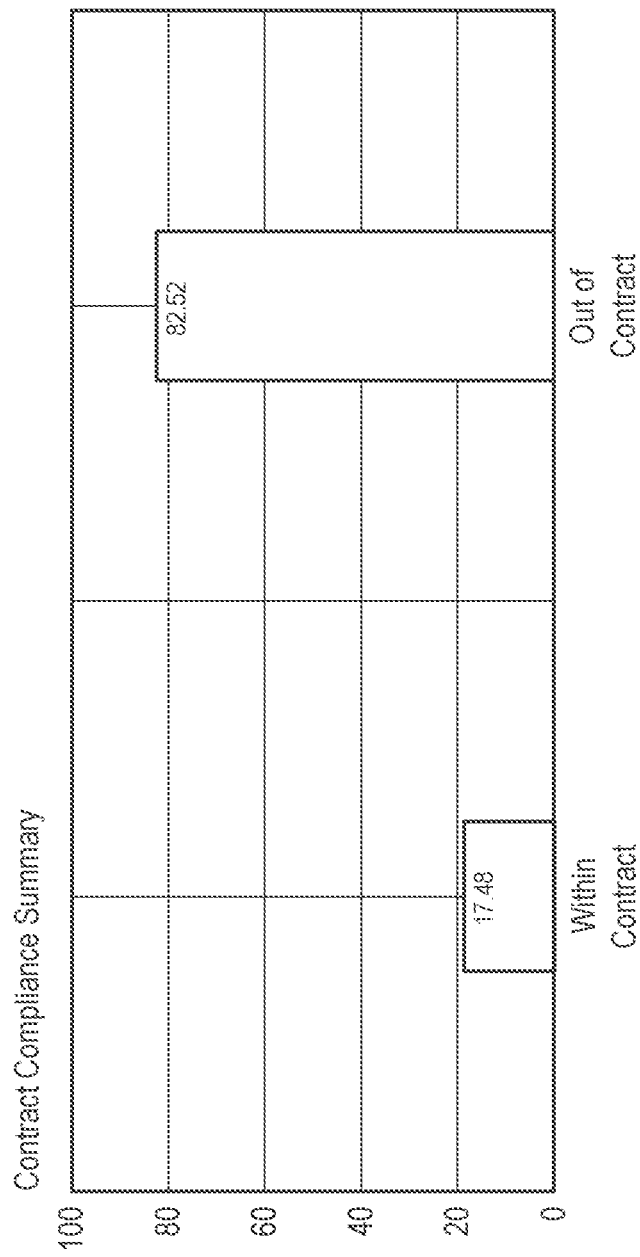
FIG. 19 illustrates an exemplary display of contract compliance summary information, consistent with disclosed embodiments.

Procurement system 120 may also generate a contract summary report, such as the report shown in FIG. 19. A contract summary report may show the percentage of items complying with the contract and a percentage of items that do not for a selected reporting period.

Figure 20:
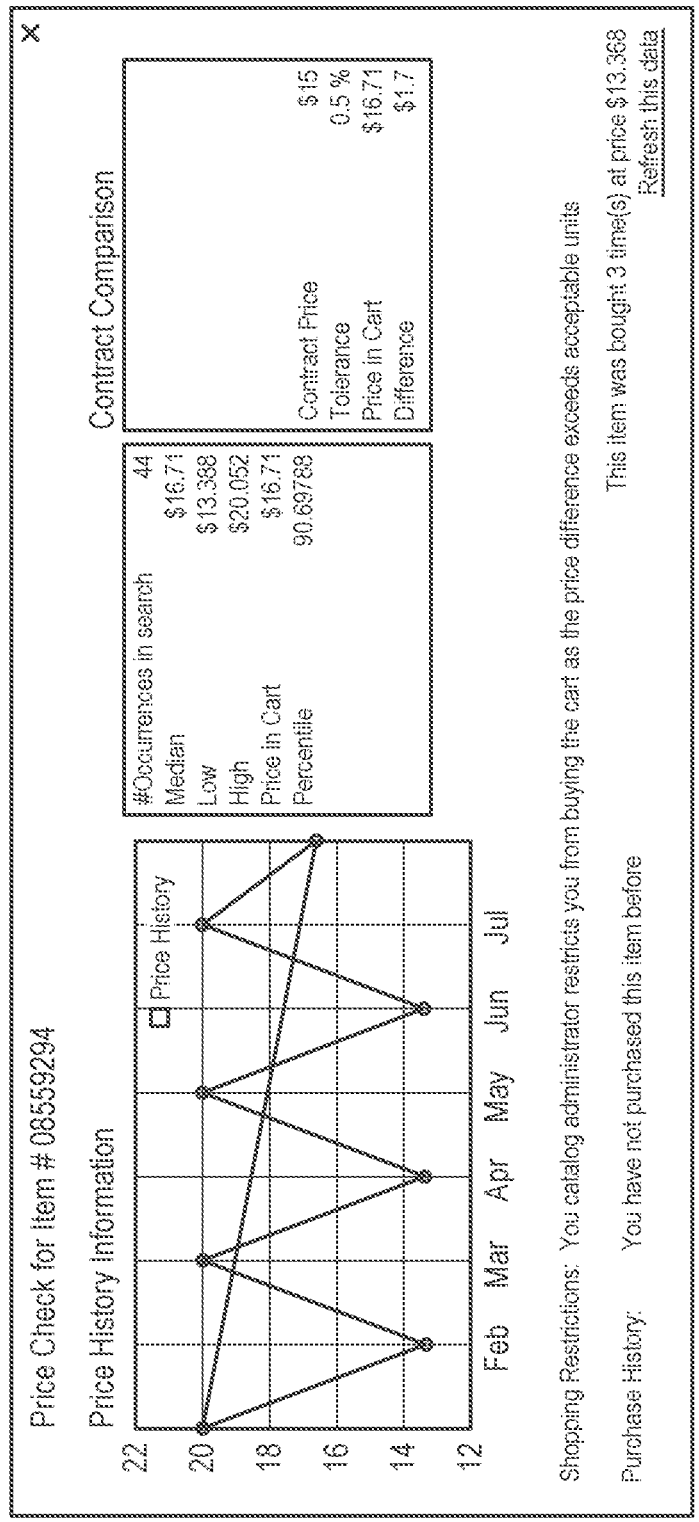
FIG. 20 illustrates an exemplary display of price and purchase history information, consistent with disclosed embodiments.

Procurement system 120 may also generate a price and purchase history report for each catalog item for a given supplier, such as the report shown in FIG. 20. Such a report may show three, six, nine, or any number of months history for a specified catalog item.

Figures 21, 22, 23, 24:
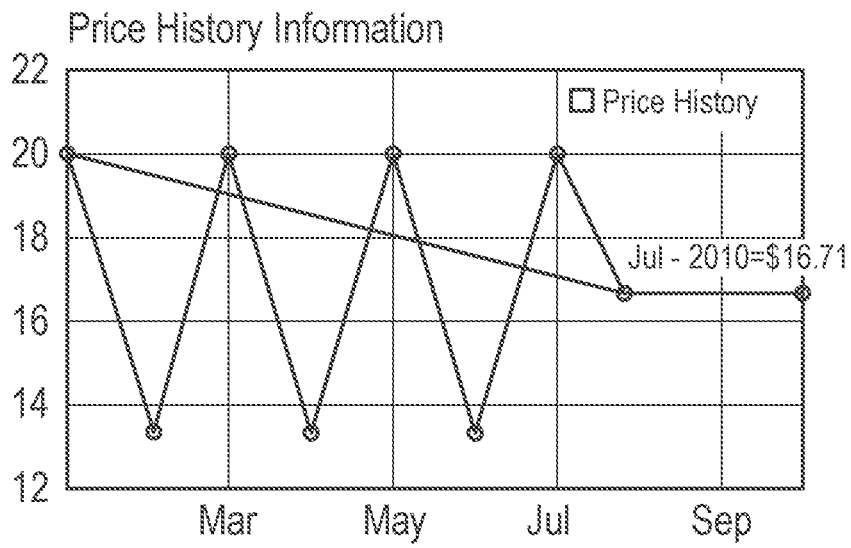
FIG. 21 illustrates an exemplary display of a price history chart, consistent with disclosed embodiments.
FIG. 22 illustrates an exemplary display of price summary information, consistent with disclosed embodiments.
FIG. 23 illustrates an exemplary display of contract comparison information, consistent with disclosed embodiments.
FIG. 24 illustrates an exemplary display of purchase history information, consistent with disclosed embodiments.

Procurement system 120 may also generate a report showing a price history during a specified time frame. Such a report may include information similar to that shown in FIG. 21, including the price history and the average price for each month. In the example of FIG. 21, the specified time frame is six months and the chart shows the average price for six months.

Procurement system 120 may also generate information showing the high, median, and low price statistics for a catalog item, along with the number of times the item turned up in search results. Such information may be displayed in an interface similar to the one shown in FIG. 22. Procurement system 120 may also determine the percentile value of the current price (the price in cart) compared with the historical price as part of such information, and generate information for displaying that data.

Procurement system 120 may also generate information showing the contract price, when available, as part of the price information so that a user may check the current price against the contract price to determine the suitability of the product from a price perspective. FIG. 23 illustrates an exemplary display of such information. In certain embodiments, the system may prevent users from checking out items that have a price more than the contract price with an unacceptable difference. Procurement system 120 may display a message, such as "Your catalog administrator restricts you from buying this item as the price difference exceeds acceptable limits" to a user in such circumstances.

Procurement system 120 may generate information used to display purchase history information of a supplier catalog item, such as the information shown in FIG. 24. This information may include the number of times the item has been purchased and the average purchase price.

FIGS. 25-30 show exemplary processes that may be performed by procurement system 120 consistent with the disclosed embodiments. The sequence of processes shown in FIGS. 25-30 may vary and additional or fewer process steps may be included without departing from the scope of the disclosed embodiments. The processes described in FIGS. 25-30 may be performed to generate information that is used by procurement system to generate the exemplary interfaces and reports described above and shown in the other Figures of this application, such as FIGS. 13-24.

Figure 25:
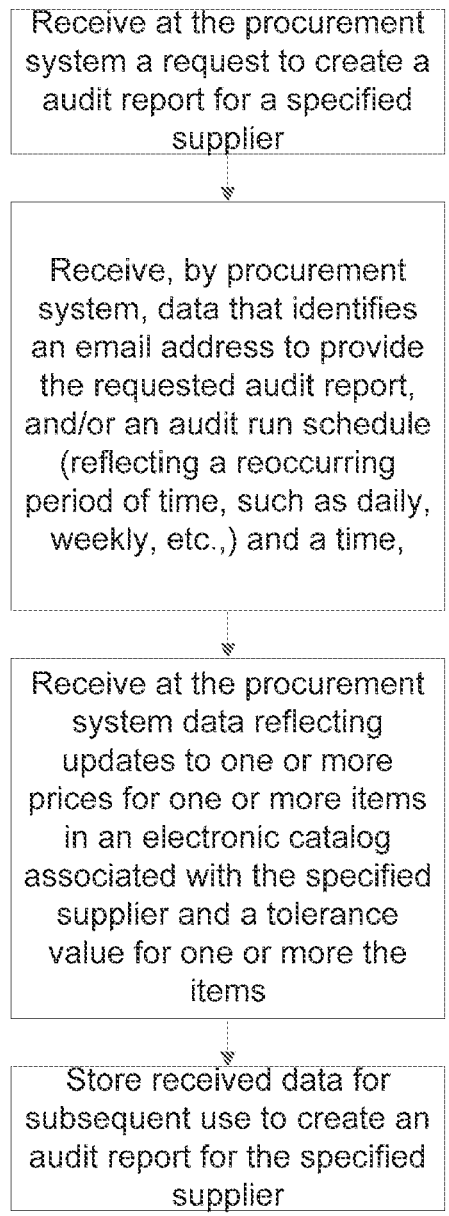
FIG. 25 illustrates an exemplary process for generating data for an audit report, consistent with disclosed embodiments.
Figure 26:
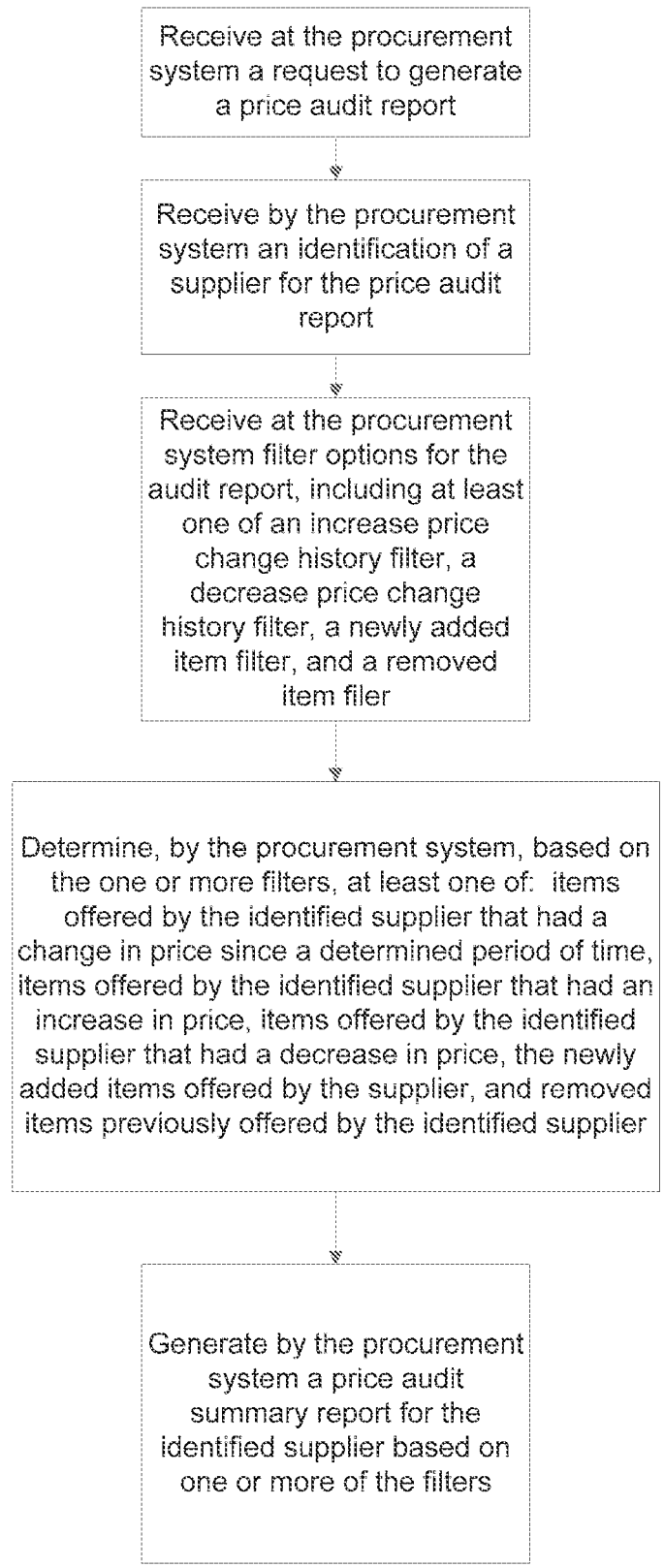
FIG. 26 illustrates an exemplary process for generating a price audit summary report, consistent with disclosed embodiments.
Figure 27:
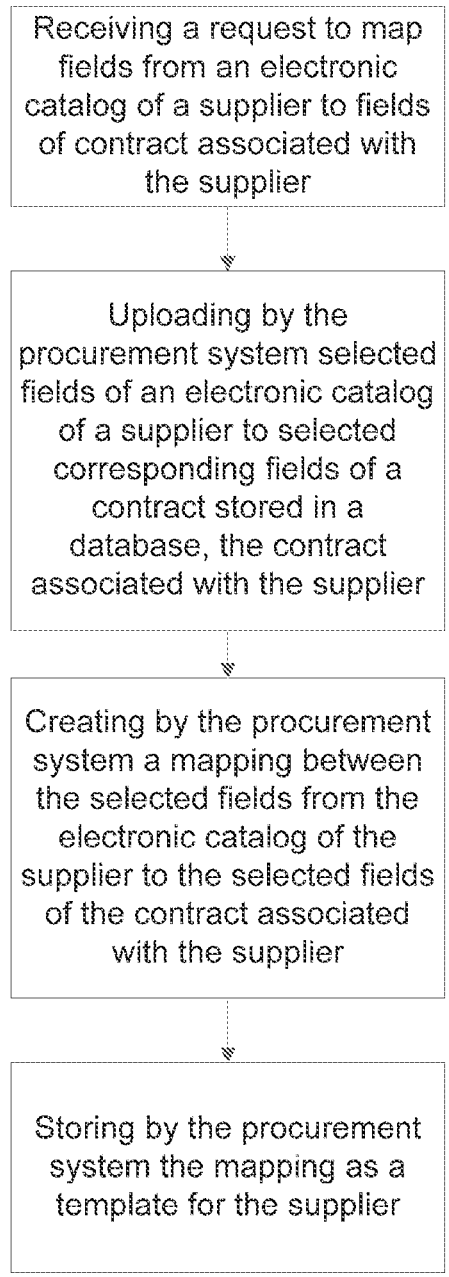
FIG. 27 illustrates an exemplary process for a mapping between fields of a contract with fields of an electronic catalog, consistent with disclosed embodiments.
Figure 28:
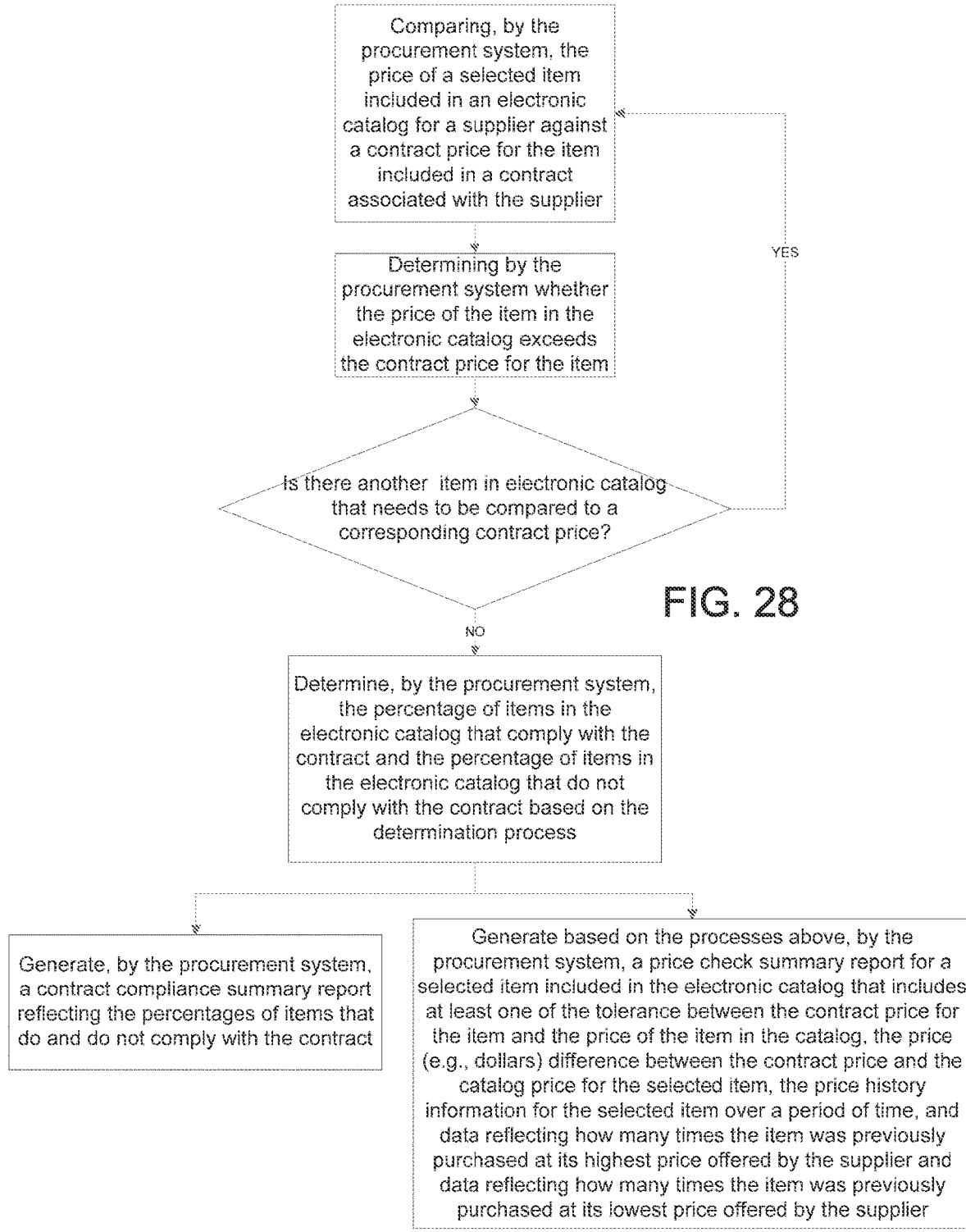
FIG. 28 illustrates an exemplary process for generating a contract compliance summary report and a price check summary report, consistent with disclosed embodiments.
Figure 29:
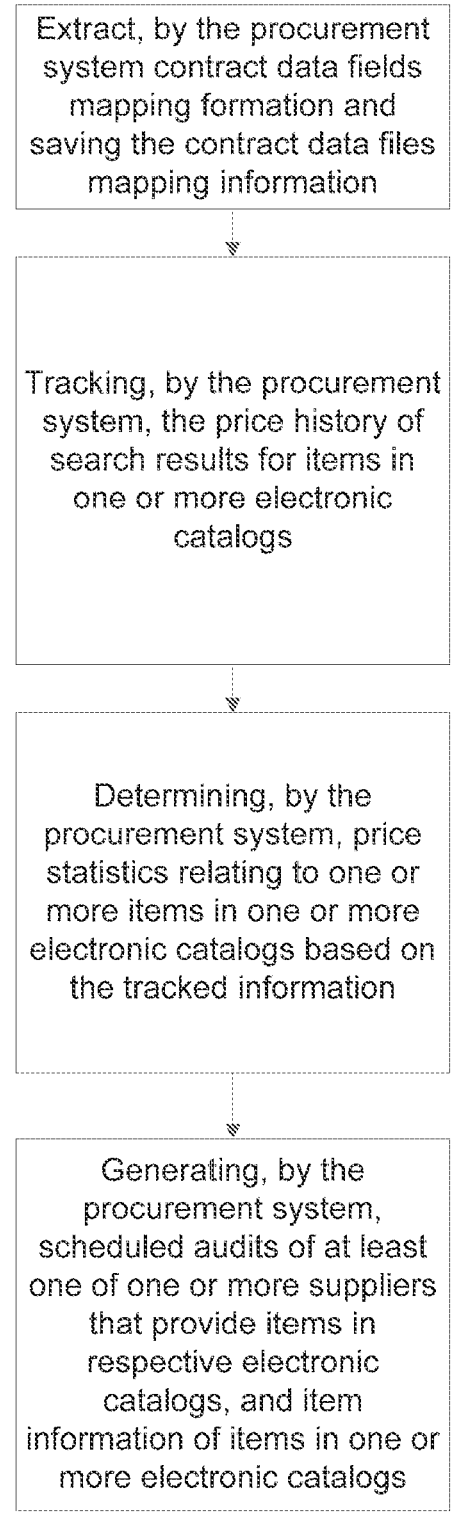
FIG. 29 illustrates an exemplary processes that may be performed by a procurement system, consistent with disclosed embodiments.
Figure 30:
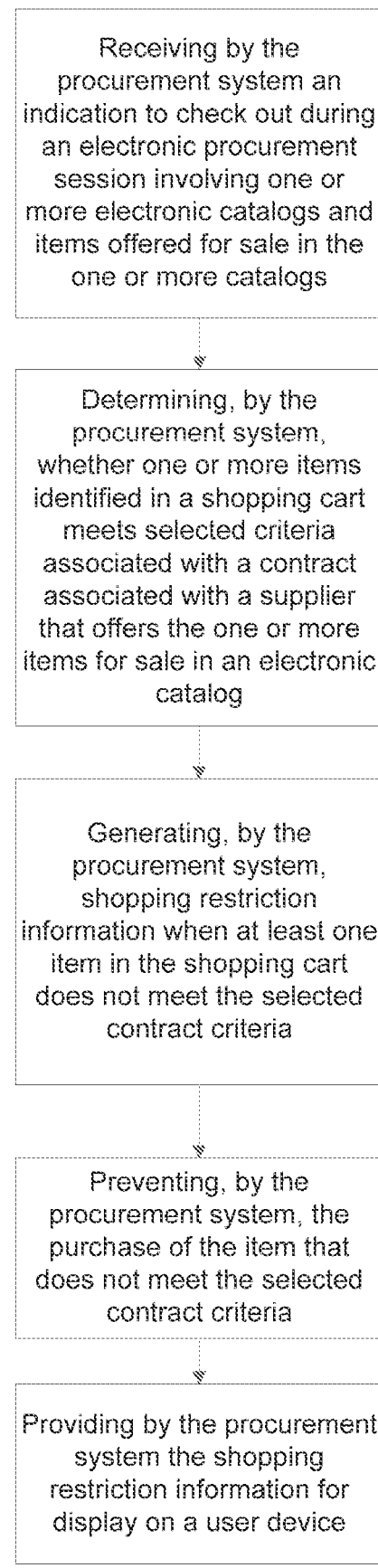
FIG. 30 illustrates an exemplary shopping restriction process, consistent with disclosed embodiments.

In one example, FIG. 25 shows an exemplary process for generating information for creating an audit report for a specified supplier consistent with certain embodiments. FIG. 26 shows an exemplary process for generating a price audit report consistent with certain disclosed embodiments. FIG. 27 shows an exemplary process for creating a mapping between fields of an contract and electronic catalog. FIG. 28 shows an exemplary process for generating a contract compliance summary report and a price check summary report consistent with certain disclosed embodiments. FIG. 29 shows an exemplary processes that may be performed by procurement system 120, including an extracting process, a tracking process, a price statistics determination process, and a scheduled audits process consistent with the disclosed embodiments. The processes illustrated in FIG. 29 may correspond to processes shown in FIGS. 25-28. FIG. 30 shows an exemplary process for generating shopping restrictions during an electronic procurement session consistent with disclosed embodiments.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, as disclosed above, the disclosed embodiments may be implemented to process static and variable pricing conditions for contracts. For instance, the disclosed embodiments enable the procurement system to process and consider a contract with static terms, such as a contract that includes conditions that indicate that a buyer may buy a certain item (e.g., paper clips) for a certain amount (e.g., one dollar per box) for the duration of the contract. Aspects of the present invention also enable the procurement system to process and consider a contract with variable pricing, such as a contract that includes conditions that indicate that a buyer may buy a certain item (e.g., paper clips) at a discount (e.g., 10% off the MSRP) for the duration of the contract. In this scenario, the manufacturer of the item (e.g., paper clips) may change their standard list price, but the buyer will always receive the discount (e.g., 10% off) from whatever the standard price is from their supplier.

Moreover, other modification and variations of the disclosed embodiments are possible. For instance, the described implementation includes software, but the disclosed embodiments may be implemented as a combination of hardware and software. Additionally, although disclosed aspects are described as being stored in a memory on a computer, one skilled in the art will appreciate that these aspects can also be stored on other types of tangible computer-readable media, such as secondary storage devices, like hard disks, floppy disks, a CD-ROM, or other forms of RAM or ROM.

Computer programs based on the written description and disclosed methods are within the capabilities of one of ordinary skill in the art. The various programs or program modules can be created using any of the techniques known to one skilled in the art or can be designed in connection with existing software. For example, program sections or program modules can be designed in or by means of DirectX, .Net Framework, .Net Compact Framework, Visual Basic, C, XML, Java, C++, JavaScript, HTML, HTML/AJAX, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A system for auditing purchases in an electronic marketplace, comprising a processor and a memory coupled to the processor, the memory storing instructions to direct the processor to perform operations comprising:
receiving, from an administrative end-user associated with a purchasing organization, an audit configuration based upon the administrative end-user:
selecting a set of items from a server-side electronic supplier catalog and setting an item identifier and a baseline price to be associated with each of said set of items;
defining a tolerance value for said baseline price comprising an acceptable price deviation from said baseline price; and
creating at least one mapping template of a set of information, received from an external electronic supplier catalog, to a set of contract fields associated with said purchasing organization wherein said contract fields include a supplier item identifier and a contract price;
launching an audit on said set of items originally baselined from the server-side electronic supplier catalog against an external client-side search of at least one electronic supplier catalog;
receiving, from said external client-side search, a set of information that may be utilized by said system to display and purchase items from said external electronic supplier catalog;
mapping said set of information using said mapping template;
determining a real-time price for at least one item of said set of items based upon said external client-side search; and
generating an analysis for a set of purchases, made by one or more purchasing end-users, through the electronic marketplace for a defined period of time which identifies:
any suppliers whose prices match said baseline price for that item;
any price differences, between said real-time price and said baseline price, for each of said items audited; and
whether said real-time price is within the tolerance value of said baseline price.

2. The system of claim 1, wherein said audit is launched in response to receiving a purchase request for a desired item and, if said real-time price for the desired item is not within the tolerance value for the baseline price for that item, said purchase request is rejected.

3. The system of claim 1, wherein said audit is launched in response to receiving a purchase request for a desired item and, if a new item, not previously included in the server-side electronic supplier catalog, is within the tolerance value for the baseline price for that item, the purchasing organization is notified of the new item.

4. The system of claim 1, wherein said baseline price comprises a contracted price between a supplier and a purchaser and wherein said audit is launched in response to a purchase request for a desired item and, if said real-time price for the desired item does not match the baseline price for that item, said electronic marketplace rejects said purchase request.

5. The system of claim 1, the memory further storing instructions to direct the processor to perform operations comprising:
searching a purchase history database to generate a plurality of purchased items purchased during a specified timeframe further including said purchased item's purchase price;
launching said audit against said purchased items;
identifying a set of uncompliant purchased items in the said purchased items, each of the set of uncompliant purchased items having said purchase price outside the tolerance value of the baseline price for that purchased item;
analyzing a set of cost savings based upon the set of uncompliant purchased items; and
providing the set of uncompliant purchased items and the set of costs savings to the purchasing organization.

6. The system of claim 5, the memory further storing instructions to direct the processor to perform operations comprising displaying an interface comprising the real-time price and a purchase history for that item from the purchase history database.

7. The system of claim 5, the memory further storing instructions to direct the processor to perform operations comprising notifying the purchasing organizations of a subset of suppliers for whom none of the audited items fall outside the tolerance value of the baseline price.

8. The system of claim 1, wherein the tolerance value is defined as a ratio in relation to the baseline price.

9. The system of claim 1, wherein said audit parameters include attributes for long item description, manufacturer name, item specification, and/or product image.

10. A method for auditing purchases in an electronic marketplace, comprising:
receiving, from an administrative end-user associated with a purchasing organization, an audit configuration based upon the administrative end-user:
selecting a set of items from a server-side electronic supplier catalog and setting an item identifier and a baseline price to be associated with each of said set of items;
defining a tolerance value for said baseline price comprising an acceptable price deviation from said baseline price; and
creating at least one mapping template of a set of information, received from an external electronic supplier catalog, to a set of contract fields associated with said purchasing organization wherein said contract fields include a supplier item identifier and a contract price;
launching an audit on said set of items originally baselined from the server-side electronic supplier catalog against an external client-side search of at least one electronic supplier catalog;
receiving, from said external client-side search, a set of information that may be utilized by said system to display and purchase items from said external electronic supplier catalog;
mapping said set of information using said mapping template;
determining a real-time price for at least one item of said set of items based upon said external client-side search; and
generating an analysis for a set of purchases, made by one or more purchasing end-users, through the electronic marketplace for a defined period of time which identifies:
any suppliers whose prices match said baseline price for that item;

any price differences, between said real-time price and said baseline price, for each of said items audited; and whether said real-time price is within the tolerance value of said baseline price.

11. The method of claim 10, wherein said audit is launched in response to receiving a purchase request for a desired item and, if said real-time price for the desired item is not within the tolerance value for the baseline price for that item, said purchase request is rejected.

12. The method of claim 10, wherein said audit is launched in response to receiving a purchase request for a desired item and, if a new item, not previously included in the server-side electronic supplier catalog, is within the tolerance value for the baseline price for that item, the purchasing organization is notified of the new item.

13. The method of claim 10, wherein said baseline price comprises a contracted price between a supplier and a purchaser and wherein said audit is launched in response to a purchase request for a desired item and, if said real-time price for the desired item does not match the baseline price for that item, said electronic marketplace rejects said purchase request.

14. The method of claim 10, further comprising:
searching a purchase history database to generate a plurality of purchased items purchased during a specified timeframe further including said purchased item's purchase price;

launching said audit against said purchased items;

identifying a set of uncompliant purchased items in the said purchased items, each of the set of uncompliant purchased items having said purchase price outside the tolerance value of the baseline price for that purchased item;

analyzing a set of cost savings based upon the set of uncompliant purchased items; and providing the set of uncompliant purchased items and the set of costs savings to the purchasing organization.

15. The method of claim 14, further comprising displaying an interface comprising the real-time price and a purchase history for that item from the purchase history database.

16. The method of claim 14, further comprising notifying the purchasing organizations of a subset of suppliers for whom none of the audited items fall outside the tolerance value of the baseline price.

17. The method of claim 10, wherein the tolerance value is defined as a ratio in relation to the baseline price.

18. The method of claim 10, wherein said audit parameters include attributes for long item description, manufacturer name, item specification, and/or product image.

* * * * *